United States Patent
Tang et al.

(10) Patent No.: US 9,593,275 B2
(45) Date of Patent: Mar. 14, 2017

(54) IN SITU METHOD FOR FORMING THERMALLY CONDUCTIVE THERMAL RADICAL CURE SILICONE COMPOSITION

(71) Applicant: Dow Corning Corporation, Midland, MI (US)

(72) Inventors: Yin Tang, Midland, MI (US); James Tonge, Sanford, MI (US); Afrooz Zarisfi, Midland, MI (US)

(73) Assignee: DOW CORNING CORPORATION, Midland, MI (US)

( * ) Notice: Subject to any disclaimer, the term of this patent is extended or adjusted under 35 U.S.C. 154(b) by 0 days.

(21) Appl. No.: 14/766,789

(22) PCT Filed: Feb. 10, 2014

(86) PCT No.: PCT/US2014/015607
§ 371 (c)(1),
(2) Date: Aug. 10, 2015

(87) PCT Pub. No.: WO2014/124382
PCT Pub. Date: Aug. 14, 2014

(65) Prior Publication Data
US 2015/0361320 A1    Dec. 17, 2015

Related U.S. Application Data

(60) Provisional application No. 61/763,144, filed on Feb. 11, 2013.

(51) Int. Cl.
| | |
|---|---|
| C09K 5/08 | (2006.01) |
| C09J 183/06 | (2006.01) |
| C09J 183/14 | (2006.01) |
| C08L 83/06 | (2006.01) |
| C08L 83/14 | (2006.01) |
| B05D 3/00 | (2006.01) |
| C08K 3/22 | (2006.01) |
| C09D 183/06 | (2006.01) |
| C08G 77/12 | (2006.01) |
| C08G 77/14 | (2006.01) |
| C08G 77/20 | (2006.01) |

(52) U.S. Cl.
CPC ............... *C09K 5/08* (2013.01); *B05D 3/007* (2013.01); *C08K 3/22* (2013.01); *C08L 83/06* (2013.01); *C08L 83/14* (2013.01); *C09D 183/06* (2013.01); *C09J 183/06* (2013.01); *C09J 183/14* (2013.01); *C08G 77/12* (2013.01); *C08G 77/14* (2013.01); *C08G 77/20* (2013.01); *C08K 2003/222* (2013.01); *C08K 2003/2227* (2013.01)

(58) Field of Classification Search
CPC .......... C08G 77/12; C08G 77/20; C08L 83/00
See application file for complete search history.

(56) References Cited

U.S. PATENT DOCUMENTS

| | | |
|---|---|---|
| 3,159,601 A | 12/1964 | Ashby |
| 3,220,972 A | 11/1965 | Lamoreaux |
| 3,296,291 A | 1/1967 | Chalk et al. |
| 3,419,593 A | 12/1968 | Willing |
| 3,516,946 A | 6/1970 | Modic |
| 3,814,730 A | 6/1974 | Karstedt |
| 3,989,668 A | 11/1976 | Lee et al. |
| 4,087,585 A | 5/1978 | Schulz |
| 4,143,088 A | 3/1979 | Favre et al. |
| 4,753,977 A | 6/1988 | Merrill |
| 4,766,176 A | 8/1988 | Lee et al. |
| 4,784,879 A | 11/1988 | Lee et al. |
| 4,962,076 A | 10/1990 | Chu et al. |
| 5,017,654 A | 5/1991 | Togashi et al. |
| 5,051,455 A | 9/1991 | Chu et al. |
| 5,053,422 A | 10/1991 | Pinza et al. |
| 5,175,325 A | 12/1992 | Brown et al. |
| 5,194,649 A | 3/1993 | Okawa |
| 5,248,715 A | 9/1993 | Gray et al. |

(Continued)

FOREIGN PATENT DOCUMENTS

| | | |
|---|---|---|
| EP | 0347895 A2 | 12/1989 |
| GB | 1 101 167 | 1/1968 |
| JP | 2011-084600 A | 4/2011 |
| WO | WO 2010008749 A1 | 1/2010 |
| WO | WO 2010141852 A1 | 12/2010 |
| WO | 2011 056832 * | 5/2011 |
| WO | WO 2011056832 A1 | 5/2011 |
| WO | 2012 064989 * | 5/2012 |
| WO | WO 2012064989 A1 | 5/2012 |

OTHER PUBLICATIONS

International Search Report for Application No. PCT/US2014/015607 dated Apr. 23, 2014, 3 pages.

(Continued)

*Primary Examiner* — Kuo-Liang Peng
(74) *Attorney, Agent, or Firm* — Howard & Howard Attorneys PLLC

(57) ABSTRACT

An in situ method for forming a thermally conductive thermal radical cure silicone composition is provided. The in situ method comprises forming a thermally conductive clustered functional polymer comprising the reaction product of a reaction of a polyorganosiloxane having an average, per molecule, of at least 2 aliphatically unsaturated organic groups; a polyorganohydrogensiloxane having an average of 4 to 15 silicon atoms per molecule; and a reactive species having, per molecule, at least 1 aliphatically unsaturated organic group and 1 or more curable groups; in the presence of a filler treating agent, a filler comprising a thermally conductive filler, an isomer reducing agent, and a hydrosilylation catalyst. The method further comprises blending the thermally conductive clustered functional polymer with a radical initiator.

14 Claims, No Drawings

(56) References Cited

U.S. PATENT DOCUMENTS

| | | |
|---|---|---|
| 5,459,206 A | 10/1995 | Somemiya et al. |
| 5,473,026 A | 12/1995 | Strong et al. |
| 5,744,507 A | 4/1998 | Angell et al. |
| 6,169,142 B1 | 1/2001 | Nakano et al. |
| 7,850,870 B2 | 12/2010 | Ahn et al. |
| 2003/0171487 A1* | 9/2003 | Ellsworth .................. C08J 5/18 524/588 |
| 2012/0245272 A1* | 9/2012 | Dent ....................... C08L 83/14 524/502 |

OTHER PUBLICATIONS

English language abstract and machine-assisted English translation for JP 2011-084600 extracted from espacenet.com database on Aug. 23, 2016, 23 pages.

* cited by examiner

IN SITU METHOD FOR FORMING THERMALLY CONDUCTIVE THERMAL RADICAL CURE SILICONE COMPOSITION

CROSS-REFERENCE TO RELATED APPLICATIONS

This application is the National Stage of International Patent Application No. PCT/US2014/015607, filed on Feb. 10, 2014, which claims priority to and all the advantages of U.S. Provisional Patent Application No. 61/763,144, filed on Feb. 11, 2013, the content of which is incorporated herein by reference.

The present invention relates generally to a method for forming a curable silicone composition, and more specifically to an in situ method for forming a thermally conductive thermal radical cure silicone composition Polyorganosiloxane compositions that cure to elastomeric materials are well known. Such compositions may be prepared by mixing polydiorganosiloxanes having curable (e.g., hydrolyzable, radiation curable, or heat curable) groups with crosslinking agents and/or catalysts, as needed. Generally, the polydiorganosiloxanes may have 1 to 3 reactive groups per chain end. Compositions including these components can then be cured, for example, by exposure to atmospheric moisture, exposure to radiation, or exposure to heat, depending on the curable groups present.

The cure rate of a particular composition depends on various factors including the type and number reactive group(s) present. It is known that different groups have different reactivities. For example, in the presence of moisture, a silicon-bonded acetoxy group will usually hydrolyze more rapidly than a silicon-bonded alkoxy group when all other conditions are the same. Furthermore, even the same type of curable group can have different reactivities depending on the number of those curable groups bonded to a particular silicon atom. For example, if a polydiorganosiloxane has three silicon-bonded alkoxy groups bonded to one silicon atom on a chain end, then the first alkoxy group is generally most reactive (reacts most quickly), but after the first alkoxy group reacts, it takes a longer time for the second alkoxy group bonded to the same silicon atom to react, and even longer for the third. Therefore, there is a continuing need to prepare clustered functional polyorganosiloxanes having more of the "most" reactive groups per molecular terminus.

The synthesis of 'dumb-bell' silicone polymers, in which long polymer chains are capped with cyclic, linear and star-shaped species having one or more organo-functional groups has been disclosed. Such polymers have been described which can undergo a number of cure chemistries, e.g., epoxy (glycidyl, alkylepoxy, and cycloaliphatic epoxy), methacrylate, acrylate, urethanes, alkoxy, or addition.

It is desirable to make multifunctional end blocked polymers (clustered functional polyorganosiloxanes) in which the curable groups are clustered at the ends/termini of the polymers. The combination of clustered functional groups with nonfunctional polymer chains separating them in the 'dumb-bell' silicone polymers may provide higher physical properties with the minimum drop in cure rate. This approach has been demonstrated for 'dumb-bell' silicone polymers in which the curable groups are the same (for example, all curable groups clustered at the polymer chain ends may be either epoxy or alkoxy). This approach has also been demonstrated for so called 'multiple cure' systems in which the curable groups differ, for example, all curable groups clustered at the polymer terminals may be a combination of epoxy and alkoxy groups.

Thermally conductive silcone compositions including these clustered functional polyorganosiloxanes are utilized in bonding hybrid circuit substrates, power semiconductor components and devices to heat sinks as well as for use in other bonding applications where flexibility and thermal conductivity are major concerns. The low viscosity versions of these thermally conductive silcone compositions are ideal for use as thermally conductive potting materials for transformers, power supplies, coils and other electronic devices that require improved thermal dissipation.

In order to make these curable polyorganosiloxane compositions more dispensable for application purposes, it is often necessary or desirable to reduce their viscosities through the use of viscosity reducing polymers, sometimes referred to as reactive diluents. Such reactive diluents should be compatible with the curable polyorganosiloxane compositions and function to reduce viscosity without adversely affecting properties of the composition both prior to application (such as storage stability) and subsequent to application (including curing rates and cured physical properties of the compositions).

BRIEF SUMMARY OF THE INVENTION

The present invention discloses a method, hereinafter referred to as an In Situ method, for forming a thermally conductive thermal radical cure silicone composition that comprises (I) a thermally conductive clustered functional polyorganopolysiloxane and (II) a radical initiator.

The method for forming a thermally conductive thermal radical cure silicone composition comprises (a) forming a thermally conductive clustered functional polymer comprising the reaction product of a reaction of a polyorganosiloxane having an average, per molecule, of at least 2 aliphatically unsaturated organic groups; a polyorganohydrogensiloxane having an average of 4 to 15 silicon atoms per molecule; and a reactive species having, per molecule, at least 1 aliphatically unsaturated organic group and 1 or more curable groups; in the presence of a filler treating agent, a filler comprising a thermally conductive filler, an isomer reducing agent, and a hydrosilylation catalyst. The in situ method further comprises (b) blending the thermally conductive clustered functional polymer with a radical initiator.

This thermally conductive silicone composition formed by the In Situ Method offers many advantages over prior adhesive compositions due to its ability to cure by two distinct methods, namely moisture cure and thermal radical cure, without adversely affecting its mechanical and physical properties. Thus, the adhesive may be used over a wider variety of substrates, including plastic substrates and metal substrates.

The thermally conductive thermal radical cure silicone composition formed by the In Situ Method are useful in composite articles of manufacture in which substrates are coated or bonded together with the curable composition and cured. They can also be used in the preparation of various electrically conductive rubbers, electrically conductive tapes, electrically conductive adhesives, electrically conductive foams, and electrically conductive pressure sensitive adhesives; especially where the rubber, tape, adhesive, or pressure sensitive adhesive, are electrically conductive silicone rubbers, electrically conductive silicone tapes, electrically conductive silicone adhesives, electrically conductive silicone foams, and electrically conductive silicone pressure sensitive adhesives.

The thermally conductive thermal radical cure silicone composition formed by the In Situ Method are useful in composite articles of manufacture in which substrates are coated or bonded together with the curable composition and cured. The thermally conductive thermal radical cure silicone composition can also be used to prepare thermal interface materials, thermally conductive rubbers, thermally conductive tapes, thermally conductive curable adhesives, thermally conductive foams, and thermally conductive pressure sensitive adhesives. They are especially useful for preparing thermally conductive thermal radical cure adhesive composition used as die attachment adhesives, solder replacements, and thermally conductive coatings and gaskets. The thermally conductive thermal radical cure adhesive composition are especially useful for bonding electronic components to flexible or rigid substrates These and other features of the invention will become apparent from a consideration of the description of the invention.

DETAILED DESCRIPTION OF THE INVENTION

The articles 'a', 'an', and 'the' each refer to one or more, unless otherwise indicated. All amounts, ratios, and percentages in this application are by weight, unless otherwise indicated. All kinematic viscosities were measured at 25° C., unless otherwise indicated.

The present invention relates to a novel method, hereinafter referred to as the "In Situ Method", for forming thermally conductive thermal radical cure silicone compositions that comprises (I) a thermally conductive clustered functional polyorganopolysiloxane and (II) a radical initiator, as well as other optional components. In certain embodiments, the thermally conductive thermal radical cure silicone compositions further includes (III) a silicone reactive diluent.

As will be discussed further below, the In Situ Method offers unique advantages for producing thermally conductive thermal radical cure silicone compositions due to its ability to cure by two distinct methods, namely moisture cure and thermal radical cure, without adversely affecting its mechanical and physical properties. Thus, the adhesive may be used over a wider variety of substrates, including plastic substrates and metal substrates.

Component (I) is a thermally conductive clustered functional polyorganopolysiloxane that includes the following subcomponents:

(a) a polyorganosiloxane having an average, per molecule, of at least 2 aliphatically unsaturated organic groups;

(b) a polyorganohydrogensiloxane having an average of 4 to 15 silicon atoms per molecule; and (c) a reactive species having, per molecule, at least 1 aliphatically unsaturated organic group and 1 or more curable groups;

(d) a hydrosilylation catalyst;

(e) an isomer reducing agent;

(f) a filler comprising a thermally conductive filler;

(g) a filler treating agent, and optional additional components.

Component (a) is a polyorganosiloxane having an average, per molecule, of at least 2 aliphatically unsaturated organic groups, which are capable of undergoing a hydrosilylation reaction with a silicon bonded hydrogen atom of component (b). Component a) may have a linear or branched structure. Alternatively, component (a) may have a linear structure. Component (a) may be a combination comprising two or more polyorganosiloxanes that differ in at least one of the following properties: structure, viscosity, degree of polymerization, and sequence.

Component (a) has a minimum average degree of polymerization (average DP) of 100. Alternatively, average DP of component (a) may range from 100 to 1000. The distribution DP of polyorganosiloxanes of component (a) can be bimodal. For example, component (a) may comprise one alkenyl terminated polydiorganosiloxane with a DP of 60 and another alkenyl terminated polydiorganosiloxane with a DP higher than 100, provided that average DP of the polydiorganosiloxanes ranges from 100 to 1000. However, suitable polyorganosiloxanes for use in component (a) have a minimum degree of polymerization (DP) of 10, provided that polyorganosiloxanes with DP less than 10 are combined with polyorganosiloxanes having DP greater than 100. Suitable polydiorganosiloxanes for component (a) are known in the art and are commercially available. For example, Dow Corning® SFD-128 has DP ranging from 800 to 1000, Dow Corning® SFD-120 has DP ranging from 600 to 700, Dow Corning® 7038 has DP of 100, and Dow Corning® SFD-119 has DP of 150. All of these are vinyl-terminated polydimethylsiloxanes are commercially available from Dow Corning Corporation of Midland, Mich., USA. When component (a) has a bimodal distribution, the polyorganosiloxane with the lower DP (low DP polyorganosiloxane) is present in a lower amount than the polyorganosiloxane with the higher DP (high DP polyorganosiloxane). For example, in a bimodal distribution, the ratio of low DP polyorganosiloxane/high DP polyorganosiloxane may range from 10/90 to 25/75.

Component (a) is exemplified by polyorganosiloxanes of formula (I), formula (II), or a combination thereof. Formula (I) is $R^7_2R^8SiO(R^1_2SiO)_g(R^7R^8SiO)_hSiR^7_2R^8$, and formula (II) is $R^7_3SiO(R^7_2SiO)_i(R^7R^8SiO)_jSiR^7_3$. In these formulae, each $R^7$ is independently a monovalent organic group free of aliphatic unsaturation, each $R^8$ is independently an aliphatically unsaturated organic group, subscript g has an average value ranging from 2 to 1000, subscript h has an average value ranging from 0 to 1000, subscript i has an average value ranging from 0 to 1000, and subscript j has an average value ranging from 4 to 1000. In formulae (I) and (II), $10 \leq (g+h) \leq 1000$ and $10 \leq (i+j) \leq 1000$.

Suitable monovalent organic groups for $R^7$ include, but are not limited to, monovalent hydrocarbon groups exemplified by alkyl such as methyl, ethyl, propyl, butyl, pentyl, octyl, undecyl, and octadecyl; cycloalkyl such as cyclohexyl; and aryl such as phenyl, tolyl, xylyl, benzyl, and 2-phenylethyl. Each $R^8$ is independently an aliphatically unsaturated monovalent organic group. $R^8$ may be an aliphatically unsaturated monovalent hydrocarbon group exemplified by alkenyl groups such as vinyl, allyl, propenyl, and butenyl; and alkynyl groups such as ethynyl and propynyl.

Component (a) may comprise a polydiorganosiloxane such as i) dimethylvinylsiloxy-terminated polydimethylsiloxane, ii) dimethylvinylsiloxy-terminated poly(dimethylsiloxane/methylvinylsiloxane), iii) dimethylvinylsiloxy-terminated polymethylvinylsiloxane, iv) trimethylsiloxy-terminated poly(dimethylsiloxane/methylvinylsiloxane), v) trimethylsiloxy-terminated polymethylvinylsiloxane, vi) dimethylvinylsiloxy-terminated poly(dimethylsiloxane/methylphenylsiloxane), vii) dimethylvinylsiloxy-terminated poly(dimethylsiloxane/diphenylsiloxane), viii) phenyl, methyl,vinyl-siloxy-terminated polydimethylsiloxane, ix) dimethylhexenylsiloxy-terminated polydimethylsiloxane, x) dimethylhexenylsiloxy-terminated poly(dimethylsiloxane/methylhexenylsiloxane), xi) dimethylhexenylsiloxy-terminated polymethylhexenylsiloxane, xii) trimethylsiloxy-terminated poly(dimethylsiloxane/methylhexenylsiloxane), or xiii) a combination thereof.

Component (b) is a polyorganohydrogensiloxane having an average of 4 to 15 silicon atoms per molecule. Component (b) has an average of at least 4 silicon bonded hydrogen atoms per aliphatically unsaturated organic group in component (a). Component (b) may be cyclic, branched, or linear. Alternatively, component (b) may be cyclic. Component (b) may be a combination comprising two or more polyorganohydrogensiloxanes that differ in at least one of the following properties: structure, viscosity, degree of polymerization, and sequence.

Component (b) may be a cyclic polyorganohydrogensiloxane having an average of 4 to 15 siloxane units per molecule. The cyclic polyorganohydrogensiloxane may have formula (III), where formula (III) is $(R^9{}_2SiO_{2/2})_k(HR^9SiO_{2/2})_l$, in which each $R^9$ is independently a monovalent organic group free of aliphatic unsaturation, subscript k has an average value ranging from 0 to 10, subscript l has an average value ranging from 4 to 15, and a quantity (k+l) has a value ranging from 4 to 15, alternatively 4 to 12, alternatively 4 to 10, alternatively 4 to 6, and alternatively 5 to 6. Monovalent organic groups suitable for $R^9$ include, but are not limited to, monovalent hydrocarbon groups exemplified by alkyl such as methyl, ethyl, propyl, butyl, pentyl, octyl, undecyl, and octadecyl; cycloalkyl such as cyclohexyl; and aryl such as phenyl, tolyl, xylyl, benzyl, and 2-phenylethyl.

Alternatively, component (b) may be a branched polyorganohydrogensiloxane. The branched polyorganohydrogensiloxane for component (b) may have formula (IV), where formula (IV) is $Si\text{---}(OSiR^{10}{}_2)_m(OSiHR^{10})_{m'}(OSiR^{10}{}_3)_n(OSiR^{10}{}_2H)_{(4-n)}$, in which each $R^{10}$ is independently a monovalent organic group free of aliphatic unsaturation, subscript m has a value ranging from 0 to 10, subscript m' has a value ranging from 0 to 10, and subscript n has a value ranging from 0 to 1.

Alternatively, subscript m may be 0. When subscript m' is 0, then subscript n is also 0. Monovalent organic groups suitable for $R^{10}$ include, but are not limited to, monovalent hydrocarbon groups exemplified by alkyl such as methyl, ethyl, propyl, butyl, pentyl, octyl, undecyl, and octadecyl; cycloalkyl such as cyclohexyl; and aryl such as phenyl, tolyl, xylyl, benzyl, and 2-phenylethyl.

Alternatively, component (b) may be a linear polyorganohydrogensiloxane having an average of at least 4 silicon bonded hydrogen atoms per molecule. The linear polyorganohydrogensiloxane for component (b) may have a formula selected from (V), (VI), or a combination thereof, where formula (V) is $R^{11}{}_2HSiO(R^{11}{}_2SiO)_o(R^{11}HSiO)_pSiR^{11}{}_2H$, formula (VI) is $R^{11}{}_3SiO(R^{11}{}_2SiO)_q(R^{11}HSiO)_rSiR^{11}{}_3$; where each $R^{11}$ is independently a monovalent organic group free of aliphatic unsaturation, subscript o has an average value ranging from 0 to 12, subscript p has an average value ranging from 2 to 12, subscript q has an average value ranging from 0 to 12, and subscript r has an average value ranging from 4 to 12 where $4 \leq (o+p) \leq 13$ and $4 \leq (q+r) \leq 13$. Monovalent organic groups suitable for $R^{11}$ include, but are not limited to, monovalent hydrocarbon groups exemplified by alkyl such as methyl, ethyl, propyl, butyl, pentyl, octyl, undecyl, and octadecyl; cycloalkyl such as cyclohexyl; and aryl such as phenyl, tolyl, xylyl, benzyl, and 2-phenylethyl.

Component (a) and component (b) may be present in amounts sufficient to provide a weight percent of silicon bonded hydrogen atoms in component (b)/a weight percent of unsaturated organic groups in component (a) (commonly referred to as $SiH_b/Vi_a$ ratio) ranging from 4/1 to 20/1, alternatively 4/1 to 10/1, and alternatively 5/1 to 20/1. Without wishing to be bound by theory, it is thought that if the $SiH_b/Vi_a$ ratio is 30/1 or higher, the components may crosslink to form a product with undesirable physical properties; and if the $SiH_b/Vi_a$ ratio is less than 4/1, the product of the process may not have sufficient clustered functional groups to have fast enough cure speed, particularly if a monofunctional reactive species (having one curable group per molecule) is used as component c).

Without wishing to be bound by theory, it is thought that using an excess of silicon bonded hydrogen atoms in component (b), relative to aliphatically unsaturated organic groups in component (a), may reduce the possibilities of producing high homologs of the clustered functional polyorganosiloxanes, which tend to be insoluble in, and may reduce storage life of, a thermally conductive clustered functional polyorganopolysiloxane prepared by the process described herein. The excess of silicon bonded hydrogen atoms in component (b) may also result in small (relatively low DP) thermally conductive clustered functional polyorganopolysiloxane, which may act as reactive diluents or viscosity modifiers and adhesion promoters. It is difficult to make these highly functional small molecules in an industrial environment because the inhibiting nature of small highly functional silicone hydrides means temperatures above 50° C. are typically required to initiate the hydrosilylation process. This is then followed by a large exotherm, which can be dangerous in the presence of large volumes of solvent, or if careful monitoring of reagents is not used to control the temperature. By simply changing the $SiH_b/Vi_a$ ratio, these species can be made in a dilute solution of clustered functional polyorganosiloxane and filler, thereby significantly reducing gelation and chance of fire due to uncontrolled exothermic reaction.

Component c) is a reactive species. The reactive species may be any species that can provide the curable groups in the thermally conductive clustered functional polyorganopolysiloxane. The reactive species has an average, per molecule, of at least one aliphatically unsaturated organic group that is capable of undergoing an addition reaction with a silicon bonded hydrogen atom of component (b). Component c) further comprises one or more radical curable groups per molecule. The radical curable groups are functional (reactive) groups that render the clustered functional polyorganosiloxane (prepared by the process described above) radiation curable. The radical curable groups on component c) may be selected from acrylate groups and methacrylate groups and combinations thereof. Alternatively, the curable groups on component c) may be selected from acrylate, alkoxy, epoxy, methacrylate, and combinations thereof.

For example, component c) may comprise a silane of formula (VIII), where formula (VIII) is $R^{12}{}_sSiR^{13}{}_{(3-s)}$; in which subscript s has a value ranging from 1 to 3, each $R^{12}$ is independently an aliphatically unsaturated organic group, and each $R^{13}$ is independently selected from an organic group containing an acrylate group and a methacrylate group.

Alternatively, component c) may comprise an organic compound (which does not contain a silicon atom). The organic compound for component c) may have an average, per molecule, of 1 to 2 aliphatically unsaturated organic groups, such as alkenyl or alkynyl groups, and one or more reactive groups selected from an acrylate group and a methacrylate group. Examples of suitable organic compounds for component c) include, but are not limited to, an allyl acrylate and allyl methacrylate (AMA); and combinations thereof.

The amount of component c) depends on various factors including the type, amount, and SiH content of component (b) and the type of component c) selected. However, the amount of component c) is sufficient to make $SiH_{tot}/Vi_{tot}$ range from 1/1 to 1/1.4, alternatively 1/1.2 to 1.1/1. The ratio $SiH_{tot}/Vi_{tot}$ means the weight percent of silicon bonded hydrogen atoms on component (b) and, if present component g) the chain extender and/or component h) the endcapper (described below), divided by the total weight percent of aliphatically unsaturated organic groups on components (a) and c) combined.

Component d) is a hydrosilylation catalyst which accelerates the reaction of components (a), (b), and c). Component d) may be added in an amount sufficient to promote the reaction of components (a), (b), and c), and this amount may be, for example, sufficient to provide 0.1 parts per million (ppm) to 1000 ppm of platinum group metal, alternatively 1 ppm to 500 ppm, alternatively 2 ppm to 200, alternatively 5 ppm to 20 ppm, based on the combined weight of all components used in the process.

Suitable hydrosilylation catalysts are known in the art and commercially available. Component d) may comprise a platinum group metal selected from platinum (Pt), rhodium, ruthenium, palladium, osmium or iridium metal or organometallic compound thereof, or a combination thereof. Component d) is exemplified by compounds such as chloroplatinic acid, chloroplatinic acid hexahydrate, platinum dichloride, and complexes of said compounds with low molecular weight organopolysiloxanes or platinum compounds microencapsulated in a matrix or coreshell type structure. Complexes of platinum with low molecular weight organopolysiloxanes include 1,3-diethenyl-1,1,3,3-tetramethyldisiloxane complexes with platinum. These complexes may be microencapsulated in a resin matrix. Alternatively, the catalyst may comprise 1,3-diethenyl-1,1,3,3-tetramethyldisiloxane complex with platinum. When the catalyst is a platinum complex with a low molecular weight organopolysiloxane, the amount of catalyst may range from 0.04% to 0.4% based on the combined weight of the components used in the process.

Suitable hydrosilylation catalysts for component d) are described in, for example, U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B. Microencapsulated hydrosilylation catalysts and methods of preparing them are known in the art, as exemplified in U.S. Pat. No. 4,766,176; and U.S. Pat. No. 5,017,654.

Component (e) is an isomer reducing agent. In certain embodiments, the isomer reducing agent comprises a carboxylic acid compound. The carboxylic acid compound may comprise (1) carboxylic acid, (2) an anhydride of a carboxylic acid, (3) a carboxylic silyl ester, and/or (4) a substance that will produce the above-mentioned carboxylic acid compounds (i.e., (1), (2), and/or (3)) through a reaction or decomposition in the reaction of the method. It is to be appreciated that a mixture of one or more of these carboxylic acid compounds may be utilized as the isomer reducing agent. For example, a carboxylic silyl ester may be utilized in combination with an anhydride of a carboxylic acid as the isomer reducing agent. In addition, a mixture within one or more types of carboxylic acid compounds may be utilized as the isomer reducing agent. For example, two different carboxylic silyl esters may be utilized in concert, or two carboxylic silyl esters may be utilized in concert with an anhydride of a carboxylic acid.

When the isomer reducing agent comprises (1) carboxylic acid, any carboxylic acid having carboxyl groups may be utilized. Suitable examples of carboxylic acids include saturated carboxylic acids, unsaturated carboxylic acids, monocarboxylic acids, and dicarboxylic acids. A saturated or unsaturated aliphatic hydrocarbon group, aromatic hydrocarbon group, halogenated hydrocarbon group, hydrogen atom, or the like is usually selected as the portion other than the carboxyl groups in these carboxylic acids. Specific examples of suitable carboxylic acids include saturated monocarboxylic acids such as formic acid, acetic acid, propionic acid, n-butyric acid, isobutyric acid, hexanoic acid, cyclohexanoic acid, lauric acid, and stearic acid; saturated dicarboxylic acids such as oxalic acid and adipic acid; aromatic carboxylic acids such as benzoic acid and paraphthalic acid; carboxylic acids in which the hydrogen atoms of the hydrocarbon groups of these carboxylic acids have been substituted with a halogen atom or an organosilyl group, such as chloroacetic acid, dichloroacetic acid, trifluoroacetic acid, para-chlorobenzoic acid, and trimethylsilylacetic acid; unsaturated fatty acids such as acrylic acid, methacrylic acid, and oleic acid; and compounds having hydroxy groups, carbonyl groups, or amino groups in addition to carboxyl groups, namely, hydroxy acids such as lactic acid, keto acids such as acetoacetic acid, aldehyde acids such as glyoxylic acid, and amino acids such as glutamic acid.

When the isomer reducing agent comprises (2) an anhydride of carboxylic acid, suitable examples of anhydrides of carboxylic acids include acetic anhydride, propionic anhydride, and benzoic anhydride. These anhydrides of carboxylic acids may be obtained via a reaction or decomposition in the reaction system include acetyl chloride, butyryl chloride, benzoyl chloride, and other carboxylic acid halides, carboxylic acid metal salts such as zinc acetate and thallium acetate, and carboxylic esters that are decomposed by light or heat, such as (2-nitrobenzyl) propionate.

In embodiments where the isomer reducing agent comprises (3) a carboxylic silyl ester, suitable examples of carboxylic silyl esters are trialkylsilylated carboxylic acids, such as trimethylsilyl formate, trimethylsilyl acetate, triethylsilyl propionate, trimethylsilyl benzoate, and trimethylsilyl trifluoroacetate; and di-, tri-, or tetracarboxysilylates, such as dimethyldiacetoxysilane, diphenyldiacetoxysilane, methyltriacetoxysilane, ethyltriacetoxysilane, vinyltriacetoxysilane, di-t-butoxydiacetoxysilane, and silicon tetrabenzoate.

The isomer reducing agent is typically utilized in an amount ranging from 0.001 to 1 weight percent, alternatively from 0.01 to 0.1 weight percent, based on the total weight of the thermally conductive clustered functional polyorganopolysiloxane. Examples of commercially available carboxylic silyl esters suitable as the isomer reducing agent are DOW CORNING® ETS 900 or XIAMETER® OFS-1579 Silane, available from Dow Corning Corporation of Midland, Mich.

The isomer reducing agent (e), added in a sufficient amount such as from 0.001 to 1 weight percent as noted above, promotes the alpha-addition of the SiH groups of the polyorganosiloxane (b) to the aliphatically unsaturated group of the reactive species c) over the beta-addition of the SiH groups of the polyorganosiloxane (b) to the aliphatically unsaturated group of the reactive species c). The beta-position addition may result in the subsequent further reaction of the polyorganosiloxane to generate Si—OH and associated silicon hydroxide product (sometimes referred to as D(Oz) and/or T(Oz) units). Without being bound by any theory, it is believed that the generation of Si—OH hastens moisture cure of the thermally conductive clustered functional polyorganopolysiloxane. The relative amount of D(Oz) units generated, which correlate to the amount of beta-position addition of SiH groups of the polyorganosiloxane (b) to the aliphatically unsaturated group of the reactive species c), may be measured by NMR.

The thermally conductive clustered functional polyorganopolysiloxane produced in accordance with the present invention utilizing a sufficient amount of isomer reducing agent (e) results in a reduction, and in certain embodiments at least a 10% reduction, in the amount of D(Oz) units present in the formed thermally conductive clustered functional polyorganopolysiloxane, as measured by NMR, which corresponds to a reduction, and in certain embodiments at least a 10% reduction in the beta-addition of SiH groups of the polyorganosiloxane (b) to the aliphatically unsaturated group of the reactive species c).

The thermally conductive clustered functional polyorganopolysiloxane also includes (f) a filler that includes a thermally conductive filler. In certain embodiments, in addition to thermally conductive filler, the filler (f) may also comprise a reinforcing filler, an extending filler, or a combination thereof.

Thermally conductive filler may be both thermally conductive and electrically conductive. Alternatively, thermally conductive filler may be thermally conductive and electrically insulating. Thermally conductive filler may be selected from the group consisting of aluminum nitride, aluminum oxide, aluminum trihydrate, barium titanate, beryllium oxide, boron nitride, carbon fibers, diamond, graphite, magnesium hydroxide, magnesium oxide, metal particulate, onyx, silicon carbide, tungsten carbide, zinc oxide, and a combination thereof. Thermally conductive filler may comprise a metallic filler, an inorganic filler, a meltable filler, or a combination thereof. Metallic fillers include particles of metals and particles of metals having layers on the surfaces of the particles. These layers may be, for example, metal nitride layers or metal oxide layers on the surfaces of the particles. Suitable metallic fillers are exemplified by particles of metals selected from the group consisting of aluminum, copper, gold, nickel, silver, and combinations thereof, and alternatively aluminum. Suitable metallic fillers are further exemplified by particles of the metals listed above having layers on their surfaces selected from the group consisting of aluminum nitride, aluminum oxide, copper oxide, nickel oxide, silver oxide, and combinations thereof. For example, the metallic filler may comprise aluminum particles having aluminum oxide layers on their surfaces.

Inorganic fillers are exemplified by onyx; aluminum trihydrate, metal oxides such as aluminum oxide, beryllium oxide, magnesium oxide, and zinc oxide; nitrides such as aluminum nitride and boron nitride; carbides such as silicon carbide and tungsten carbide; and combinations thereof. Alternatively, inorganic fillers are exemplified by aluminum oxide, zinc oxide, and combinations thereof. Meltable fillers may comprise Bi, Ga, In, Sn, or an alloy thereof. The meltable filler may optionally further comprise Ag, Au, Cd, Cu, Pb, Sb, Zn, or a combination thereof. Examples of suitable meltable fillers include Ga, In—Bi—Sn alloys, Sn—In—Zn alloys, Sn—In—Ag alloys, Sn—Ag—Bi alloys, Sn—Bi—Cu—Ag alloys, Sn—Ag—Cu—Sb alloys, Sn—Ag—Cu alloys, Sn—Ag alloys, Sn—Ag—Cu—Zn alloys, and combinations thereof. The meltable filler may have a melting point ranging from 50° C. to 250° C., alternatively 150° C. to 225° C. The meltable filler may be a eutectic alloy, a non-eutectic alloy, or a pure metal. Meltable fillers are commercially available.

For example, meltable fillers may be obtained from Indium Corporation of America, Utica, N.Y., U.S.A.; Arconium, Providence, R.I., U.S.A.; and AIM Solder, Cranston, R.I., U.S.A. Aluminum fillers are commercially available, for example, from Toyal America, Inc. of Naperville, Ill., U.S.A. and Valimet Inc., of Stockton, Calif., U.S.A. Silver filler is commercially available from Metalor Technologies U.S.A. Corp. of Attleboro, Mass., U.S.A. Silver flake filler is sold under the tradename RA-127 by the American Chemet Corporation, Chicago, Ill.

Thermally conductive fillers are known in the art and commercially available, see for example, U.S. Pat. No. 6,169,142 (col. 4, lines 7-33). For example, CB-A20S and Al-43-Me are aluminum oxide fillers of differing particle sizes commercially available from Showa-Denko, DAW-45 is aluminum oxide filler commercially available from Denka, and AA-04, AA-2, and AA18 are aluminum oxide fillers commercially available from Sumitomo Chemical Company. Zinc oxides, such as zinc oxides having trademarks KADOX® and XX®, are commercially available from Zinc Corporation of America of Monaca, Pa., U.S.A.

The shape of thermally conductive filler particles is not specifically restricted, however, rounded or spherical particles may prevent viscosity increase to an undesirable level upon high loading of thermally conductive filler in the composition.

Thermally conductive filler may be a single thermally conductive filler or a combination of two or more thermally conductive fillers that differ in at least one property such as particle shape, average particle size, particle size distribution, and type of filler. For example, it may be desirable to use a combination of inorganic fillers, such as a first aluminum oxide having a larger average particle size and a second aluminum oxide having a smaller average particle size. Alternatively, it may be desirable, for example, use a combination of an aluminum oxide having a larger average particle size with a zinc oxide having a smaller average particle size. Alternatively, it may be desirable to use combinations of metallic fillers, such as a first aluminum having a larger average particle size and a second aluminum having a smaller average particle size. Alternatively, it may be desirable to use combinations of metallic and inorganic fillers, such as a combination of aluminum and aluminum oxide fillers; a combination of aluminum and zinc oxide fillers; or a combination of aluminum, aluminum oxide, and zinc oxide fillers. Use of a first filler having a larger average particle size and a second filler having a smaller average particle size than the first filler may improve packing efficiency, may reduce viscosity, and may enhance heat transfer.

The average particle size of thermally conductive filler will depend on various factors including the type of thermally conductive filler selected and the exact amount added to the curable silicone composition, as well as the bondline thickness of the device in which the cured product of the composition will be used when the cured product will be used as a thermal interface material (TIM). However, thermally conductive filler may have an average particle size ranging from 0.1 micrometer to 80 micrometers, alternatively 0.1 micrometer to 50 micrometers, and alternatively 0.1 micrometer to 10 micrometers.

The amount of thermally conductive filler as a part of (f) in thermally conductive thermal radical cure silicone composition depends on various factors including the cure mechanism selected and the specific thermally conductive filler selected. However, the amount of thermally conductive filler as a part of (f) may range from 30 vol % to 80 vol %, alternatively 50 vol % to 75 vol % by volume of thermally conductive thermal radical cure adhesive composition. Without wishing to be bound by theory, it is thought that when the amount of thermally conductive filler as a part of (f) is greater than 80 vol %, thermally conductive thermal radical cure silicone composition may crosslink to form a cured silicone with insufficient dimensional integrity for some applications, and when the amount of thermally conductive filler as a part of (f) is less than 30%, the cured silicone prepared from thermally conductive thermal radical cure silicone composition may have insufficient thermal conductivity for TIM applications.

When alumina powder is used as thermally conductive filler, it is preferably a mixture of a first spherical alumina filler and a second spherical or irregularly shaped alumina powder having a different, preferably smaller average particle size. The amount of thermally conductive filler (f) is typically added in an amount such that thermally conductive thermal radical cure silicone composition has a thermal conductivity of about 1 Watt per meter Kelvin or more. This improves packing efficiency and can reduce the viscosity and enhance heat transfer.

In certain embodiments, the thermally conductive thermal radical cure silicone composition may optionally further comprise a reinforcing filler, which when present may be added in an amount ranging from 0.1% to 95%, alternatively 1% to 60%, based on the weight of all components in thermally conductive thermal radical cure adhesive composition. The exact amount of the reinforcing filler depends on various factors including the form of the cured product of the composition (e.g., gel or rubber) and whether any other fillers are added. Examples of suitable reinforcing fillers include chopped fiber such as chopped KEVLAR, and/or reinforcing silica fillers such as fume silica, silica aerogel, silica xerogel, and precipitated silica. Fumed silicas are known in the art and commercially available; e.g., fumed silica sold under the name CAB-O-SIL by Cabot Corporation of Massachusetts, U.S.A.

The thermally conductive thermal radical cure silicone composition may optionally further comprise an extending filler in an amount ranging from 0.1% to 95%, alternatively 1 to 60%, and alternatively 1% to 20%, based on the weight of all components in thermally conductive thermal radical cure adhesive composition. Examples of extending fillers include crushed quartz, aluminum oxide, magnesium oxide, calcium carbonate such as precipitated calcium carbonate, zinc oxide, talc, diatomaceous earth, iron oxide, clays, mica, titanium dioxide, zirconia, sand, carbon black, graphite, or a combination thereof. Extending fillers are known in the art and commercially available; such as ground silica sold under the name MIN-U-SIL by U.S. Silica of Berkeley Springs, W. Va. Suitable precipitated calcium carbonates included Winnofil® SPM from Solvay and Ultraplex® and Ultraplex® 100 from SMI.

The filler (f) may also include a filler treating agent (g). The filler treating agent (g) may be a treating agent, which is known in the art. The amount of filler treating agent (g) may vary depending on various factors including the type and amounts of thermally conductive fillers selected for component (f) and whether the filler (f) is treated with filler treating agent in situ or pretreated before being combined. However, the components may comprise an amount ranging from 0.1% to 5% of filler treating agent (g), based on the weight of the filler (f) and the type of the filler.

The filler treating agent (g) may comprise a silane such as an alkoxysilane, an alkoxy-functional oligosiloxane, a cyclic polyorganosiloxane, a hydroxyl-functional oligosiloxane such as a dimethyl siloxane or methyl phenyl siloxane, a stearate, or a fatty acid. The alkoxysilane may have the formula: $R^{10}{}_p Si(OR^{11})_{(4-p)}$, where subscript p is 1, 2, or 3; alternatively p is 3. Each $R^{10}$ is independently a monovalent organic group of 1 to 50 carbon atoms, such as a monovalent hydrocarbon group of 1 to 50 carbon atoms, alternatively 6 to 18 carbon atoms. Suitable monovalent hydrocarbon groups for $R^{10}$ are exemplified by alkyl groups such as hexyl, octyl, dodecyl, tetradecyl, hexadecyl, and octadecyl; and aromatic groups such as benzyl, phenyl and phenylethyl. $R^{10}$ can be a monovalent hydrocarbon group that is saturated or unsaturated and branched or unbranched. Alternatively, $R^{10}$ can be a saturated, unbranched, monovalent hydrocarbon group. Each $R^{11}$ may be a saturated hydrocarbon group of 1 to 4 carbon atoms, alternatively 1 to 2 carbon atoms.

Alkoxysilane filler treating agents (g) are exemplified by hexyltrimethoxysilane, octyltriethoxysilane, decyltrimethoxysilane, dodecyltrimethoxysilane, tetradecyltrimethoxysilane, phenyltrimethoxysilane, phenylethyltrimethoxysilane, octadecyltrimethoxysilane, octadecyltriethoxysilane, and a combination thereof.

Alkoxy-functional oligosiloxanes can also be used as filler treating agents (g). Alkoxy-functional oligosiloxanes and methods for their preparation are known in the art, see for example, EP 1 101 167 A2. For example, suitable alkoxy-functional oligosiloxanes include those of the formula $(R^{14}O)_q Si(OSiR^{12}{}_2 R^{13})_{(4-q)}$. In this formula, subscript q is 1, 2, or 3, alternatively q is 3. Each $R^{12}$ can be independently selected from saturated and unsaturated monovalent hydrocarbon groups of 1 to 10 carbon atoms. Each $R^{13}$ can be a saturated or unsaturated monovalent hydrocarbon group having at least 11 carbon atoms. Each $R^{14}$ can be an alkyl group.

Alternatively, the filler treating agent (g) can be any of the organosilicon compounds typically used to treat silica fillers. Examples of organosilicon compounds include, but are not limited to, organochlorosilanes such as methyltrichlorosilane, dimethyldichlorosilane, and trimethyl monochlorosilane; organosiloxanes such as hydroxy-endblocked dimethylsiloxane oligomer, hexamethyldisiloxane, and tetramethyldivinyldisiloxane; organosilazanes such as hexamethyldisilazane and hexamethylcyclotrisilazane; and organoalkoxysilanes such as methyltrimethoxysilane, vinyltrimethoxysilane, vinyltriethoxysilane, 3-glycidoxypropyltrimethoxysilane, and 3-methacryloxypropyltrimethoxysilane. Examples of stearates include calcium stearate. Examples of fatty acids include stearic acid, oleic acid, palmitic acid, tallow, coconut oil, and combinations thereof. Examples of filler treating agents and methods for their use are disclosed in, for example, EP 1 101 167 A2 and U.S. Pat. Nos. 5,051,455, 5,053,442, and 6,169,142 (col. 4, line 42 to col. 5, line 2).

Filler treating agents (g) may include alkoxysilyl functional alkylmethyl polysiloxanes (e.g., partial hydrolysis condensate of $R^{22}{}_w R^{23}{}_x Si(OR^{24})_{(4-w-x)}$ or cohydrolysis condensates or mixtures), or similar materials where the hydrolyzable group may comprise silazane, acyloxy or oximo. In all of these, a group tethered to Si, such as $R^{22}$ in the formula above, is a long chain unsaturated monovalent hydrocarbon or monovalent aromatic-functional hydrocarbon. Each $R^{23}$ is independently a monovalent hydrocarbon group, and each $R^{24}$ is independently a monovalent hydrocarbon group of 1 to 4 carbon atoms. In the formula above, subscript w is 1, 2, or 3 and subscript x is 0, 1, or 2, with the proviso that the sum (w+x) is 1, 2, or 3. One skilled in the art would recognize that the alkoxysilanes and mercapto-functional compounds described as adhesion promoters for component (IX)(see below) may alternatively be used, in addition to or instead of, filler treating agents (g) for the filler (f). One skilled in the art could optimize a specific treatment to aid dispersion of the filler without undue experimentation.

Other filler treating agents (g) include alkenyl functional polyorganosiloxanes. Suitable alkenyl functional polyorganosiloxanes include, but are not limited to:

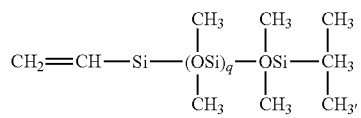

where subscript q has a value up to 1,500. Other treating agents include mono-endcapped alkoxy functional polydiorganosiloxanes, i.e., polydiorganosiloxanes having an alkoxy group at one end. Such treating agents are exemplified by the formula: $R^{25}R^{26}{}_2SiO(R^{26}{}_2SiO)_uSi(OR^{27})_3$, where subscript u has a value of 0 to 100, alternatively 1 to 50, alternatively 1 to 10, and alternatively 3 to 6. Each $R^{25}$ is independently selected from an alkyl group, such as Me, Et, Pr, Bu, hexyl, and octyl; and an alkenyl group, such as Vi, allyl, butenyl, and hexenyl. Each $R^{26}$ is independently an alkyl group such as Me, Et, Pr, Bu, hexyl, and octyl. Each $R^{27}$ is independently an alkyl group such as Me, Et, Pr, and Bu. Alternatively, each $R^{25}$, each $R^{26}$, and each $R^{27}$ is Me. Alternatively, each $R^{25}$ is a vinyl group (Vi). Alternatively, each $R^{26}$ and each $R^{27}$ is methyl (Me).

Alternatively, a polyorganosiloxane capable of hydrogen bonding is useful as a filler treating agent (g). This strategy to treating the surface of a thermally conductive filler takes advantage of multiple hydrogen bonds, either clustered or dispersed or both, as the means to tether the compatibilization moiety to the filler surface. The polyorganosiloxane capable of hydrogen bonding has an average, per molecule, of at least one silicon-bonded group capable of hydrogen bonding. The group may be selected from: an organic group having multiple hydroxyl functionalities or an organic group having at least one amino functional group. The polyorganosiloxane capable of hydrogen bonding means that hydrogen bonding is the primary mode of attachment for the polyorganosiloxane to thermally conductive filler. The polyorganosiloxane may be incapable of forming covalent bonds with thermally conductive filler. The polyorganosiloxane capable of hydrogen bonding may be selected from the group consisting of a saccharide-siloxane polymer, an amino-functional polyorganosiloxane, and a combination thereof. Alternatively, the polyorganosiloxane capable of hydrogen bonding may be a saccharide-siloxane polymer.

Component (II) is a radical initiator. The radical initiator may be a thermal radical initiator. Thermal radical initiators include, but are not limited to, dicumyl peroxide, n-butyl 4,4'-bis(butylperoxy)valerate, 1,1-bis(t-butylperoxy)-3,3,5 trimethyl cyclohexane, di-t-butyl peroxide and 2,5-di-(t-butylperoxy)-2,5 dimethyl hexane, 1,1-bis(tert-amylperoxy) cyclohexane (Luperox® 531 M80); 2,2-bis(tert-butylperoxy)butane; 2,4-pentanedione peroxide (Luperox® 224), 2,5-bis(tert-butylperoxy)-2,5-dimethylhexane (Luperox® 101), 2,5-di(tert-butylperoxy)-2,5-dimethyl-3-hexyne; 2-butanone peroxide, benzoyl peroxide, cumene hydroperoxide, di-tert-amyl peroxide (Luperox® DTA®), lauroyl peroxide (Luperox® LP), tert-butyl hydroperoxide; tert-butyl peracetate; tert-butyl peroxybenzoate; tert-butylperoxy 2-ethylhexyl carbonate; di(2,4-dichlorobenzoyl) peroxide; dichlorobenzoylperoxide (available as Varox® DCBP from R. T. Vanderbilt Company, Inc. of Norwalk, Conn., USA); di(tert-butylperoxyisopropyl)benzene, di(4-methylbenzoyl) peroxide, butyl 4,4-di(tert-butylperoxy)valerate, 3,3,5,7,7-pentamethyl-1,2,4-trioxepane; tert-butyl peroxy-3,5,5-trimethylhexanoate; tert-butyl cumyl peroxide; di(4-tert-butylcyclohexyl) peroxydicarbonate (available as Perkadox 16); dicetyl peroxydicarbonate; dimyristyl peroxydicarbonate; 2,3-dimethyl-2,3-diphenylbutane, dioctanoyl peroxide; tert-butylperoxy 2-ethylhexyl carbonate; tert-amyl peroxy-2-ethylhexanoate, tert-amyl peroxypivalate; and combinations thereof.

Examples of such thermal radical initiators (II) are commercially available under the following trade names: Luperox® sold by Arkema, Inc. of Philadelphia, Pa., U.S.A.; Trigonox and Perkadox sold by Akzo Nobel Polymer Chemicals LLC of Chicago, Ill., U.S.A., VAZO sold by E.I. duPont deNemours and Co. of Wilmington, Del., USA; VAROX® sold by R.T. Vanderbilt Company, Inc. of Norwalk, Conn., U.S.A.; and Norox sold by Syrgis Performance Initiators, Inc. of Helena, Ark., U.S.A.

Alternatively, the radical initiator (II) may comprise a redox reagent as an initiator for radical polymerization. The reagent may be a combination of peroxide and an amine or a transition metal chelate. The redox reagent is exemplified by, but not limited to, diacyl peroxides such as benzoyl peroxide and acetyl peroxide; hydroperoxides such as cumene hydroperoxide and t-butyl hydroperoxide; ketone peroxides such as methyl ethyl ketone peroxide and cyclohexanone peroxide; dialkyl peroxides such as dicumyl peroxide and ti-t-butyl peroxide; peroxy esters such as t-butyl peroxy acetate; and combinations of thioglycerol and pyrazoles and/or pyrazolones. Alternatively, the redox reagent may be exemplified by dimethylaniline, 3,5-dimethylpyrazole, thioglycerol; and combinations thereof. Examples of suitable redox reagent initiators are known in the art and are exemplified as in U.S. Pat. No. 5,459,206. Other suitable peroxides are known in the art and are commercially available such as lauroyl peroxide (Luperox® LP from Arkema), dichlorobenzoylperoxide (Varox® DCBP from R. T. Vanderbilt Company, Inc.) and 6N tert-butyl hydroperoxide.

The concentration of the radical initiator (I) may range from 0.01% to 15%, alternatively from 0.1% to 5%, and alternatively 0.1% to 2%, based on the weight of the thermally conductive clustered functional polyorganosiloxane (I).

Thermally conductive thermally radical cure adhesive composition may optionally comprise one or more additional components. The additional components are exemplified by (III) a silicone diluent, (III) a clustered functional polyorganosiloxane; (V) a moisture cure initiator, (VI) a crosslinker, (VII) a moisture cure polymer, (VIII) a solvent, (IX) an adhesion promoter, (X) a colorant, (XI) a reactive diluent, (XII) a corrosion inhibitor, (XIII) a polymerization inhibitor, and (XIV) an acid acceptor, and a combination thereof.

Optional Component (III) is a silicone reactive diluent. The silicone reactive diluent (III) aids in dispensing of the curable silicone composition by reducing the viscosity of the curable silicone composition to make it more flowable.

In certain embodiments, the amount of silicone reactive diluent (III) utilized ranges from 20 to 90 weight percent, alternatively from 40 to 70 weight percent, alternatively from 55 to 80 weight percent, alternatively from 55 to 75 weight percent, alternatively 70 weight percent, based on the total silicone matrix weight of thermally conductive thermal radical cure adhesive composition.

The silicone reactive diluent (III) may be a monofunctional silicone reactive diluent, a difunctional silicone reactive diluent, a polyfunctional silicone reactive diluent, or a combination thereof. The silicone reactive diluent selected will depend on various factors including the curable groups. However, examples of suitable silicone reactive diluents include an acrylate, an anhydride such as a maleic anhydride or methacrylic anhydride, an epoxy such as a monofunctional epoxy compound, a methacrylate such as glycidyl methacrylate, an oxetane, a vinyl acetate, a vinyl ester, a vinyl ether, a fluoro alkyl vinyl ether, a vinyl pyrrolidone such as N-vinyl pyrrolidone, a styrene, or a combination thereof.

In certain embodiments, the silicone reactive diluent (III) may be formed in a first embodiment as the reaction product of a reaction of:

a) a polyorganohydrogensiloxane having an average of 10 to 200 silicon atoms per molecule; and b) a reactive species having, per molecule, at least 1 aliphatically unsaturated organic group and 1 or more curable groups;

in the presence of c) an isomer reducing agent and d) a hydrosilylation catalyst and e) inhibitor for hydrosilylation catalyst.

In certain other embodiments, additional optional components may also be included in the silicone reactive diluent (III) of the first embodiment.

Component a) of the silicone reactive diluent (III) in the first embodiment is a polyorganohydrogensiloxane having an average of 10 to 200 silicon atoms per molecule. Component a) may be branched or linear. Component a) may be monofunctional (i.e., includes one silicon-bonded hydrogen atom), a difunctional (i.e., includes two silicon-bonded hydrogen atoms), a polyfunctional (i.e., includes more than two silicon-bonded hydrogen atoms), or a combination thereof. Component a) may be a combination comprising two or more polyorganohydrogensiloxanes each having an average of 10 to 200 silicon atoms per molecule that differ in at least one of the following properties: structure, viscosity, degree of polymerization, and sequence.

In certain embodiments, component a) may be a polydiorganosiloxane terminated at both ends with hydrogen atoms. One exemplary polydiorganosiloxane terminated at both ends with hydrogen atoms may have the formula $HR_2Si-(R_2SiO)_a-SiR_2H$, where each R is independently a monovalent hydrocarbon group exemplified by alkyl such as methyl, ethyl, propyl, butyl, pentyl, and hexyl; and aryl such as phenyl, tolyl, xylyl, and benzyl. Subscript a has an average value ranging from 0 to 400, alternatively 10 to 200.

Alternatively, component a) may be a branched polyorganohydrogensiloxane. The branched polyorganohydrogensiloxane for component b) may have the formula $Si-(OSiR^2_2)_b(OSiHR^2)_{b'}(OSiR^2_3)_c(OSiR^2_2H)_{(4-c)}$, in which each $R^2$ is independently a monovalent organic group free of aliphatic unsaturation, subscript b has a value ranging from 0 to 10, subscript b' has a value ranging from 0 to 10, and subscript c has a value ranging from 0 to 1.

Alternatively, subscript b may be 0. When subscript b' is 0, then subscript c is also 0. Monovalent organic groups suitable for $R^2$ include, but are not limited to, monovalent hydrocarbon groups exemplified by alkyl such as methyl, ethyl, propyl, butyl, pentyl, octyl, undecyl, and octadecyl; cycloalkyl such as cyclohexyl; and aryl such as phenyl, tolyl, xylyl, benzyl, and 2-phenylethyl.

Component b) of the silicone reactive diluent (III) in the first embodiment is a reactive species. The reactive species b) may be any species that can provide the curable groups in the silicone reactive diluent. The reactive species has an average, per molecule, of at least one aliphatically unsaturated organic group that is capable of undergoing an addition reaction with a silicon bonded hydrogen atom of component a). Component b) further comprises one or more radical curable groups per molecule. The radical curable groups are functional (reactive) groups that render the silicone reactive diluent radiation curable. The radical curable groups on component b) may be selected from acrylate groups and methacrylate groups and combinations thereof.

For example, in certain embodiments, component b) may comprise a silane of formula $R^3_dSiR^4_{(3-d)}$; in which subscript d has a value ranging from 1 to 3, each $R^3$ is independently an aliphatically unsaturated organic group, and each $R^4$ is independently selected from an organic group containing an acrylate group and a methacrylate group.

Alternatively, component b) may comprise an organic compound (which does not contain a silicon atom). The organic compound for component b) may have an average, per molecule, of 1 to 2 aliphatically unsaturated organic groups, such as alkenyl or alkynyl groups, and one or more reactive groups selected from an acrylate group and a methacrylate group. Examples of suitable organic compounds for component b) include, but are not limited to, allyl acrylate and allyl methacrylate (AMA), and combinations thereof.

The amount of component b) depends on various factors including the type, amount, and SiH content of component a) and the type of component b) selected. However, the amount of component b) is sufficient to make $SiH_{tot}/Vi_{tot}$ range from 1/1 to 1/1.4, alternatively 1/1.2 to 1.1/1. The ratio $SiH_{tot}/Vi_{tot}$ means the weight percent of total amount of silicon bonded hydrogen atoms on component b) divided by the total weight percent of aliphatically unsaturated organic groups on component a).

Component (c) of the silicone reactive diluent (III) in the first embodiment is an isomer reducing agent. In certain embodiments, the isomer reducing agent comprises a carboxylic acid compound. The carboxylic acid compound may comprise (1) carboxylic acid, (2) an anhydride of a carboxylic acid, (3) a carboxylic silyl ester, and/or (4) a substance that will produce the above-mentioned carboxylic acid compounds (i.e., (1), (2), and/or (3)) through a reaction or decomposition in the reaction of the method. It is to be appreciated that a mixture of one or more of these carboxylic acid compounds may be utilized as the isomer reducing agent. For example, a carboxylic silyl ester may be utilized in combination with an anhydride of a carboxylic acid as the isomer reducing agent. In addition, a mixture within one or more types of carboxylic acid compounds may be utilized as the isomer reducing agent. For example, two different carboxylic silyl esters may be utilized in concert, or two carboxylic silyl esters may be utilized in concert with an anhydride of a carboxylic acid.

When the isomer reducing agent comprises (1) carboxylic acid, any carboxylic acid having carboxyl groups may be utilized. Suitable examples of carboxylic acids include saturated carboxylic acids, unsaturated carboxylic acids, monocarboxylic acids, and dicarboxylic acids. A saturated or unsaturated aliphatic hydrocarbon group, aromatic hydrocarbon group, halogenated hydrocarbon group, hydrogen atom, or the like is usually selected as the portion other than the carboxyl groups in these carboxylic acids. Specific examples of suitable carboxylic acids include saturated monocarboxylic acids such as formic acid, acetic acid, propionic acid, n-butyric acid, isobutyric acid, hexanoic acid, cyclohexanoic acid, lauric acid, and stearic acid; saturated dicarboxylic acids such as oxalic acid and adipic acid; aromatic carboxylic acids such as benzoic acid and para-phthalic acid; carboxylic acids in which the hydrogen atoms of the hydrocarbon groups of these carboxylic acids have been substituted with a halogen atom or an organosilyl group, such as chloroacetic acid, dichloroacetic acid, trifluoroacetic acid, para-chlorobenzoic acid, and trimethylsilylacetic acid; unsaturated fatty acids such as acrylic acid, methacrylic acid, and oleic acid; and compounds having hydroxy groups, carbonyl groups, or amino groups in addition to carboxyl groups, namely, hydroxy acids such as lactic acid, keto acids such as acetoacetic acid, aldehyde acids such as glyoxylic acid, and amino acids such as glutamic acid.

When the isomer reducing agent comprises (2) an anhydride of carboxylic acid, suitable examples of anhydrides of carboxylic acids include acetic anhydride, propionic anhydride, and benzoic anhydride. These anhydrides of carboxylic acids may be obtained via a reaction or decomposition in the reaction system include acetyl chloride, butyryl chloride, benzoyl chloride, and other carboxylic acid halides, carboxylic acid metal salts such as zinc acetate and thallium acetate, and carboxylic esters that are decomposed by light or heat, such as (2-nitrobenzyl) propionate.

In embodiments where the isomer reducing agent comprises (3) a carboxylic silyl ester, suitable examples of carboxylic silyl esters are trialkylsilylated carboxylic acids, such as trimethylsilyl formate, trimethylsilyl acetate, triethylsilyl propionate, trimethylsilyl benzoate, and trimethylsilyl trifluoroacetate; and di-, tri-, or tetracarboxysilylates, such as dimethyldiacetoxysilane, diphenyldiacetoxysilane, methyltriacetoxysilane, ethyltriacetoxysilane, vinyltriacetoxysilane, di-t-butoxydiacetoxysilane, and silicon tetrabenzoate.

The isomer reducing agent is typically utilized in an amount ranging from 0.001 to 1 weight percent, alternatively from 0.01 to 0.1 weight percent, based on the total weight of the formed silicone reactive diluent. Examples of commercially available carboxylic silyl esters suitable as the isomer reducing agent are DOW CORNING® ETS 900 or XIAMETER® OFS-1579 Silane, available from Dow Corning Corporation of Midland, Mich.

The isomer reducing agent (c), added in a sufficient amount such as from 0.001 to 1 weight percent as noted above, promotes the alpha-addition of the SiH groups of the polydiorganosiloxane (a) to the aliphatically unsaturated group of the reactive species b) over the beta-addition of the SiH groups of the polydiorganosiloxane (a) to the aliphatically unsaturated group of the reactive species b). The beta-position addition may result in the subsequent further reaction of the polyorganosiloxane to generate Si—OH and associated silicon hydroxide product (sometimes referred to as D(Oz) and/or T(Oz) units). Without being bound by any theory, it is believed that the generation of Si—OH hastens moisture cure of the polydiorganosiloxanes of the silicone reactive diluent (III). The relative amount of D(Oz) units generated, which correlate to the amount of beta-position addition of SiH groups of the polyorganosiloxane (ii) to the aliphatically unsaturated group of the reactive species (c), may be measured by NMR.

Component d) of the silicone reactive diluent (III) in the first embodiment is a hydrosilylation catalyst which accelerates the reaction of components a) and b). Component d) may be added in an amount sufficient to promote the reaction of components a) and b), and this amount may be, for example, sufficient to provide 0.1 parts per million (ppm) to 1000 ppm of platinum group metal, alternatively 1 ppm to 500 ppm, alternatively 2 ppm to 200, alternatively 5 ppm to 150 ppm, based on the combined weight of all components used in the process.

Suitable hydrosilylation catalysts are known in the art and commercially available. Component d) may comprise a platinum group metal selected from platinum (Pt), rhodium, ruthenium, palladium, osmium or iridium metal or organometallic compound thereof, or a combination thereof. Component d) is exemplified by compounds such as chloroplatinic acid, chloroplatinic acid hexahydrate, platinum dichloride, and complexes of said compounds with low molecular weight organopolysiloxanes or platinum compounds microencapsulated in a matrix or coreshell type structure. Complexes of platinum with low molecular weight organopolysiloxanes include 1,3-diethenyl-1,1,3,3-tetramethyldisiloxane complexes with platinum. These complexes may be microencapsulated in a resin matrix. Alternatively, the catalyst may comprise 1,3-diethenyl-1,1,3,3-tetramethyldisiloxane complex with platinum. When the catalyst is a platinum complex with a low molecular weight organopolysiloxane, the amount of catalyst may range from 0.04% to 0.4% based on the combined weight of the components used in the process.

Suitable hydrosilylation catalysts for component d) are described in, for example, U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B. Microencapsulated hydrosilylation catalysts and methods of preparing them are known in the art, as exemplified in U.S. Pat. No. 4,766,176; and U.S. Pat. No. 5,017,654.

Component e) of the silicone reactive diluent (III) in the first embodiment is a catalyst inhibitor, which is added to deactivate component d) (the hydrosilylation catalyst) and stabilize the formed silicone reactive diluent. Some examples of suitable catalyst inhibitors include ethylenically or aromatically unsaturated amides, acetylenic compounds such as 2-ethynyl-isopropanol, 2-ethynyl-butane-2-ol, 2-methyl-3-butyn-2-ol, 2-phenyl-3-butyn-2-ol, 3,5-dimethyl-1-hexyn-3-ol, 1-ethynyl-1-cyclohexanol, 1,5-hexadiene, 1,6-heptadiene; 3,5-dimethyl-1-hexen-1-yne; 3-ethyl-3-buten-1-yne or 3-phenyl-3-buten-1-yne; ethylenically unsaturated isocyanates; silylated acetylenic alcohols exemplified by trimethyl (3,5-dimethyl-1-hexyn-3-oxy)silane, dimethyl-bis-(3-methyl-1-butyn-oxy)silane, methylvinylbis (3-methyl-1-butyn-3-oxy)silane, and ((1,1-dimethyl-2-propynyl)oxy)trimethylsilane; unsaturated hydrocarbon diesters; conjugated ene-ynes exemplified by 2-isobutyl-1-butene-3-yne, 3,5-dimethyl-3-hexene-1-yne, 3-methyl-3-pentene-1-yne, 3-methyl-3-hexene-1-yne, 1-ethynylcyclohexene, 3-ethyl-3-butene-1-yne, and 3-phenyl-3-butene-1-yne; olefinic siloxanes such as 1,3-divinyltetramethyldisiloxane, 1,3,5,7-tetravinyltetramethyl cyclotetrasiloxane, or 1,3-divinyl-1,3-diphenyldimethyldisiloxane; 1,3,5,7-tetramethyl-1,3,5,7-tetravinylcyclotetrasiloxane; a mixture of a conjugated ene-yne as described above and an olefinic siloxane as described above; hydroperoxides; nitriles and diaziridines; unsaturated carboxylic esters exemplified by diallyl maleate, dimethyl maleate, diethyl fumarate, diallyl fumarate, and bis-2-methoxy-1-methylethylmaleate, mono-octylmaleate, mono-isooctylmaleate, mono-allyl maleate, mono-methyl maleate, monoethyl fumarate, mono-allyl fumarate, and 2-methoxy-1-methylethylmaleate; fumarates such as diethylfumarate; fumarate/alcohol mixtures wherein the alcohol is benzyl alcohol or 1-octanol and ethenyl cyclohexyl-1-ol; a nitrogen-containing compound such as tributylamine, tetramethylethylenediamine, benzotriazole; a similar phosphorus-containing compound such as triphenylphosphine; a sulphur-containing compound; a hydroperoxy compound; or a combination thereof.

The inhibitors are used in an amount effective to deactivate component d) the hydrosilylation catalyst. The amount will vary depending on the type and amount of catalyst and the type of inhibitor selected, however, the amount may range from 0.001 to 3 parts by weight, and alternatively from 0.01 to 1 part by weight per 100 parts by weight of component a).

In addition to Components a)-e), other optional components may be utilized in forming the silicone reactive diluent (III) of the first embodiment. For example, in certain embodiments, the silicone reactive diluent may further include f) a polymerization inhibitor and g) an endcapper.

Optional component f) of the silicone reactive diluent (III) in the first embodiment is a polymerization inhibitor. The unsaturated groups (e.g., methacrylate, acrylate, vinyl or allyl) can autopolymerize via unwanted radical process. These radical processes can be mitigated by the addition of polymerization inhibitors. Examples of suitable polymerization inhibitors for acrylate and methacrylate curable groups include, but are not limited to: 2,6,-Di-tert-butyl-4-(dimethylaminomethyl)phenol (DBAP), hydroquinone (HQ); 4-methoxyphenol (MEHQ); 4-ethoxyphenol; 4-propoxyphenol; 4-butoxyphenol; 4-heptoxyphenol; butylated hydroxytoluene (BHT); hydroquinone monobenzylether; 1,2-dihydroxybenzene; 2-methoxyphenol; 2,5-dichlorohydroquinone; 2,5-di-tert-butylhydroquinone; 2-acetylhydroquinone; hydroquinone monobenzoate; 1,4-dimercaptobenzene; 1,2-dimercaptobenzene; 2,3,5-trimethylhydroquinone; 4-aminophenol; 2-aminophenol; 2-N, N-dimethylaminophenol; 2-mercaptophenol; 4-mercaptophenol; catechol monobutylether; 4-ethylaminophenol; 2,3-dihydroxyacetophenone; pyrogallol-1,2-dimethylether; 2-methylthiophenol; t-butyl catechol; di-tert-butylnitroxide; di-tert-amylnitroxide; 2,2,6,6-tetramethyl-piperidinyloxy; 4-hydroxy-2,2,6,6-tetramethyl-piperidinyloxy; 4-oxo-2,2,6,6-tetramethyl-piperidinyloxy; 4-dimethylamino-2,2,6,6-tetramethyl-piperidinyloxy; 4-amino-2,2,6,6-tetramethyl-piperidinyloxy; 4-ethanoloxy-2,2,6,6-tetramethyl-piperidinyloxy; 2,2,5,5-tetramethyl-pyrrolidinyloxy; 3-amino-2,2,5,5-tetramethyl-pyrrolidinyloxy; 2,2,5,5-tetramethyl-1-oxa-3-azacyclopentyl-3-oxy; 2,2,5,5-tetramethyl-3-pyrrolinyl-1-oxy-3-carboxylic acid; 2,2,3,3,5,5,6,6-octamethyl-1,4-diazacyclohexyl-1,4-dioxy; salts of 4-nitrosophenolate; 2-nitrosophenol; 4-nitrosophenol; copper dimethyldithiocarbamate; copper diethyldithiocarbamate; copper dibutyldithiocarbamate; copper salicylate; methylene blue; iron; phenothiazine (PTZ); 3-oxophenothiazine; 5-oxophenothiazine; phenothiazine dimer; 1,4-benzenediamine; N-(1,4-dimethylpentyl)-N'-phenyl-1,4-benzenediamine; N-(1,3-dimethylbutyl)-N'-phenyl-1,4-benzenediamine; N-nitrosophenylhydroxylamine and salts thereof; nitric oxide; nitrobenzene; p-benzoquinone; pentaerythrityl tetrakis(3-laurylthiopropionate); dilauryl thiodipropionate; distearyll thiodipropionate; ditridecyl thiodipropionate; tetrakis[methylene 3-(3,5-di-tert-butyl-4-hydroxyphenyl)propionate]methane; thiodiethylene bis[3-(3,5-di-tert-butyl-4-hydroxyphenyl)propionate]; octadecyl-3-(3,5-di-tert-butyl-4-hydroxyphenyl) propionate; isotridecyl-3-(3,5-di-tert-butyl-4-hydroxyphenyl) propionate; N,N'-hexamethyl (3,5-di-tertbutyl-4-hydroxyhydrocinnamamide); iso-octyl-3-(3, 5-di-tert-butyl-4-hydroxyphenyl) propionate; 2,2'-ethylidenebis-(4,6-di-tert-butylphenol); 1,3,5-trimethyl-2,4, 6-tris(3,5-di-tert-butyl-4-hydroxybenzyl) benzene; 4,6-bis (octylthiomethyl)-o-cresol; triethylene glycol-bis-3-(3-tert-butyl-4-hydroxy-5-methylphenyl)propionate; tris-(3,5-di-tert-butylhydroxybenzyl) isocyanurate; tris(2,4-di-tert-butylphenyl) phosphate; distearyl pentaerythritol diphosphite; bis(2,4-di-tert-butyl phenyl)pentaerythritol diphosphite; 2,5-di-tert-amyl-hydroquinone; or isomers thereof; combinations of two or more thereof; or combinations of one or more of the above with molecular oxygen. When present, the polymerization inhibitor may be added to the curable silicone composition in an amount ranging from 100 ppm to 4,000 ppm.

Optional component g) of the silicone reactive diluent (III) in the first embodiment is an endcapper. The endcapper may be a polydiorganosiloxane having one hydrogen atom per molecule. An exemplary endcapper may have the formula $R^5_3Si\text{—}(R^5_2SiO)_e\text{—}SiR^5_2H$. In this formula, each $R^5$ is independently a monovalent hydrocarbon group exemplified by alkyl such as methyl, ethyl, propyl, butyl, pentyl, and hexyl; and aryl such as phenyl, tolyl, xylyl and benzyl; and subscript e has a value ranging from 0 to 10, alternatively 1 to 10, and alternatively 1. Another exemplary endcapper may have the formula $R^6_3Si\text{—}(R^6_2SiO)_f\text{—}(HR^6SiO)\text{—}SiR^6_3$. In this formula, each $R^6$ is independently a monovalent hydrocarbon group exemplified by alkyl such as methyl, ethyl, propyl, butyl, pentyl, and hexyl; and aryl such as phenyl, tolyl, xylyl and benzyl. Subscript f has a value ranging from 0 to 10, alternatively 0.

The endcapper may provide the benefit of producing a looser network of higher tensile properties when used as a mole percentage of the available SiH in the system. The amount of endcapper added may range from 0 to 15%, alternatively 2% to 15%, and alternatively 10%, based on the combined weight of all components used in the process.

A secondary benefit of having an endcapper in the process is initial reduction in viscosity prior to reaction, which may facilitate the reaction and reduce the tendency for gelation due to insufficient mixing and local gel formation.

The weight percent of silicon bonded hydrogen atoms in the components/weight percent of unsaturated organic groups capable of undergoing hydrosilylation in the components (commonly referred to as $SiH_{tot}/Vi_{tot}$ ratio) may range from 1/1.4 to 1/1, alternatively 1/1.2 to 1/1.1. In this ratio, $SiH_{tot}$ refers to the amount of silicon bonded hydrogen atoms in any of the components of the silicone reactive diluent. $Vi_{tot}$ refers to the total amount of aliphatically unsaturated organic groups in the silicone reactive diluent.

In certain embodiments, the silicone reactive diluent (III) of the first embodiment is formed by:
1) concurrently reacting components comprising:
   a) a polyorganohydrogensiloxane having an average of 10 to 200 silicon atoms per molecule; and
   b) a reactive species having, per molecule, at least 1 aliphatically unsaturated organic group and 1 or more curable groups;
   in the presence of c) an isomer reducing agent and (d) a hydrosilylation catalyst, and optionally f) a polymerization inhibitor and g) an endcapper.

The resulting mixture of a), b), c), d) and optionally f) and g) may be sheared before addition of component c) at room temperature. The reaction may then be initiated by raising the temperature to a range from 50° C. to 100° C., alternatively 70° C. to 85° C., and maintaining the temperature until all of the SiH has reacted, as measured by the time needed for the SiH peak as observed by Fourier Transform Infra Red spectroscopy (FT-IR) at about 2170 cm$^{-1}$, to be reduced into the background of the spectra.

Next, the catalyst inhibitor e) is added to the resulting mixture to deactivate the hydrosilylation catalyst c). In certain embodiments, the introduction of the catalyst inhibitor e) is done after reducing the temperature of the reaction mixture of a), b), c), d) and optionally f) and g) below the minimum reaction temperature of 50° C., such as at room temperature. The formed silicone reactive diluent (III) may be stored for subsequent use.

In an alternative or second embodiment, the silicone reactive diluent (III) may be formed as the reaction product of a reaction of:

a) a siloxane compound according to the formula:

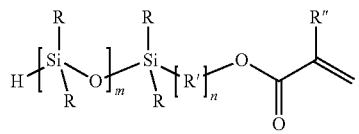

wherein:
R is a monovalent hydrocarbon having 1 to 6 carbon atoms,
R' is a monovalent hydrocarbon having 3 to 12 carbon atoms.
R" is H or CH$_3$, and
the subscript m and n each independently have a value from 1 to 10, and b) a polyorganosiloxane having an average, per molecule, of at least 2 aliphatically unsaturated organic groups, in the presence of c) a first hydrosilylation catalyst and d) an inhibitor for the first hydrosilylation catalyst, as well as other additional optional components.

Component b) of the silicone reactive diluent (III) of the second embodiment is a polyorganosiloxane having an average, per molecule, of at least 2 aliphatically unsaturated organic groups, which are capable of undergoing a hydrosilylation reaction with a silicon bonded hydrogen atom of the siloxane compound a). Component b) may have a linear or branched structure. Alternatively, component b) may have a linear structure. Component b) may be a combination comprising two or more polyorganosiloxanes that differ in at least one of the following properties: structure, viscosity, degree of polymerization, and sequence.

Component b) has a minimum average degree of polymerization (average DP) of 10. Alternatively, average DP of component b) may range from 10 to 1000 alternatively 100 to 200. The distribution DP of polyorganosiloxanes of component a) can be bimodal. For example, component b) may comprise one alkenyl terminated polydiorganosiloxane with a DP of 2 and another alkenyl terminated polydiorganosiloxane with a DP higher than 10, provided that average DP of the polydiorganosiloxanes ranges from 10 to 1000. However, suitable polyorganosiloxanes for use in component b) have a minimum degree of polymerization (DP) of 10, provided that polyorganosiloxanes with DP less than 10 are combined with polyorganosiloxanes having DP greater than 10. Suitable polydiorganosiloxanes for component a) are known in the art and are commercially available. For example, Dow Corning® SFD-128 has DP ranging from 800 to 1000, Dow Corning® SFD-120 has DP ranging from 600 to 700, Dow Corning® 7038 has DP of 100, and Dow Corning® SFD-119 has DP of 150. All of these are vinyl-terminated polydimethylsiloxanes are commercially available from Dow Corning Corporation of Midland, Mich., USA. When component b) has a bimodal distribution, the polyorganosiloxane with the lower DP (low DP polyorganosiloxane) is present in a lower amount than the polyorganosiloxane with the higher DP (high DP polyorganosiloxane). For example, in a bimodal distribution, the ratio of low DP polyorganosiloxane/high DP polyorganosiloxane may range from 10/90 to 25/75.

Component b) is exemplified by polyorganosiloxanes of formula (I), formula (II), or a combination thereof. Formula (I) is $R^1_2R^2SiO(R^1_2SiO)_a(R^1R^2SiO)_bSiR^1_2R^2$, and formula (II) is $R^1_3SiO(R^1_2SiO)_d(R^1R^2SiO)_dSiR^1_3$. In these formulae, each $R^1$ is independently a monovalent organic group free of aliphatic unsaturation, each $R^2$ is independently an aliphatically unsaturated organic group, subscript a has an average value ranging from 2 to 1000, subscript b has an average value ranging from 0 to 1000, subscript c has an average value ranging from 0 to 1000, and subscript d has an average value ranging from 4 to 1000. In formulae (I) and (II), $10 \leq (a+b) \leq 1000$ and $10 \leq (c+d) \leq 1000$.

Suitable monovalent organic groups for $R^1$ include, but are not limited to, monovalent hydrocarbon groups exemplified by alkyl such as methyl, ethyl, propyl, butyl, pentyl, octyl, undecyl, and octadecyl; cycloalkyl such as cyclohexyl; and aryl such as phenyl, tolyl, xylyl, benzyl, and 2-phenylethyl. Each $R^2$ is independently an aliphatically unsaturated monovalent organic group. $R^2$ may be an aliphatically unsaturated monovalent hydrocarbon group exemplified by alkenyl groups such as vinyl, allyl, propenyl, and butenyl; and alkynyl groups such as ethynyl and propynyl.

Component b) may comprise a polydiorganosiloxane such as i) dimethylvinylsiloxy-terminated polydimethylsiloxane, ii) dimethylvinylsiloxy-terminated poly(dimethylsiloxane/methylvinylsiloxane), iii) dimethylvinylsiloxy-terminated polymethylvinylsiloxane, iv) trimethylsiloxy-terminated poly(dimethylsiloxane/methylvinylsiloxane), v) trimethylsiloxy-terminated polymethylvinylsiloxane, vi) dimethylvinylsiloxy-terminated poly(dimethylsiloxane/methylphenylsiloxane), vii) dimethylvinylsiloxy-terminated poly(dimethylsiloxane/diphenylsiloxane), viii) phenyl, methyl,vinyl-siloxy-terminated polydimethylsiloxane, ix) dimethylhexenylsiloxy-terminated polydimethylsiloxane, x) dimethylhexenylsiloxy-terminated poly(dimethylsiloxane/methylhexenylsiloxane), xi) dimethylhexenylsiloxy-terminated polymethylhexenylsiloxane, xii) trimethylsiloxy-terminated poly(dimethylsiloxane/methylhexenylsiloxane), or xiii) a combination thereof.

The relative amounts of the siloxane compound a) and the polyorganosiloxane b) in the silicone reactive diluent (III) of the second embodiment may vary such that the SiH:vinyl weight ratio ranges from 0.8:1 to 1:1.

Suitable hydrosilylation catalysts d) and inhibitors for the hydrosilylation catalyst e) that may be used in forming of the silicone reactive diluent (III) of the second embodiment include each of the hydrosilylation catalysts described above and not repeated herein.

In addition to Components a)-d), other optional components may be utilized in forming the silicone reactive diluent (III) according to this alternative embodiment, including f) a polymerization inhibitor and g) an endcapper, the descriptions of which are the same as provided as optional components f) and g) for forming the silicone reactive diluent (III) according to the first embodiment and not repeated herein.

Component (IV) of the thermally conductive thermal radical cure silicone composition is a clustered functional polyorganosiloxane. Examples of clustered functional polyorganosiloxane that may be included herein are disclosed in U.S. Patent Publication No. 2012/0245272 to Dent et. al. Another alternative clustered functional polyorganosiloxane that may be used herein comprises the reaction product of a reaction of components (a)-(e) of the thermally conductive clustered functional polyorganopolysiloxane (I) described above and including additional optional components as described in Dent et. al.

Component (V) of the thermally conductive thermal radical cure silicone composition is a moisture cure initiator (i.e, a condensation reaction catalyst). Examples of condensation reaction catalysts are known in the art and are disclosed in U.S. Pat. Nos. 4,962,076; 5,051,455; 5,053,442; 4,753,977 at col. 4, line 35 to col. 5, line 57; and 4,143,088 at col. 7, line 15 to col. 10, line 35. The amount of the condensation reaction catalyst depends on various factors including the type of catalyst selected and the choice of the remaining components in the composition, however the amount of the condensation reaction catalyst may range from 0.001% to 5% based on the weight of thermally conductive thermally radical cure adhesive composition.

Suitable condensation reaction catalyst may be a Lewis acid; a primary, secondary, or tertiary organic amine; a metal oxide; a titanium compound; a tin compound; a zirconium compound; or a combination thereof. The condensation reaction catalyst may comprise a carboxylic acid salt of a metal ranging from lead to manganese inclusive in the electromotive series of metals. Alternatively, the condensation reaction catalyst may comprise a chelated titanium compound, a titanate such as a tetraalkoxytitanate, a titanium ester, or a combination thereof. Examples of suitable titanium compounds include, but are not limited to, diisopropoxytitanium bis(ethylacetoacetate), tetrabutoxy titanate, tetrabutyltitanate, tetraisopropyltitanate, and bis-(ethoxyacetoacetonate)diisopropoxy titanium (IV), and a combination thereof. Alternatively the condensation reaction catalyst may comprise a tin compound such as dibutyltin diacetate; dibutyltin dilaurate; dibutyl tin oxide; stannous octoate; tin oxide; a titanium ester, such as tetrabutyl titanate, tetraethylhexyl titanate and tetraphenyltitanate; a siloxytitanate, such as tetrakis(trimethylsiloxy)titanium and bis(trimethylsiloxy)-bis(isopropoxy)titanium; and a betadicarbonyltitanium compound, such as bis(acetylacetonyl)diisopropyl titanate; or a combination thereof. Alternatively, the condensation reaction catalyst may comprise an amine, such as hexylamine; or an acetate or quat salt of an amine.

Component (VI) of the thermally conductive thermal radical cure silicone composition is a crosslinker. The type and amount of crosslinker will depend on various factors including the type and amount of curable groups on component (VII).

In certain embodiments, the crosslinker (VI) is a condensation reaction crosslinker that may be selected from, for example, trialkoxysilanes exemplified by propyltrimethoxysilane, phenyltrimethoxysilane, glycidoxypropyltrimethoxysilane, ethyltrimethoxysilane, aminopropyltrimethoxysilane, aminoethylaminopropyltrimethoxysilane, methyltrimethoxysilane, phenyl trimethoxysilane, and methyltriethoxysilane; acetoxysilanes such as methyltriacetoxysilane or ethyltriacetoxysilane; ketoximosilanes such as methyltri(methylethylketoximo)silane, tetra(methylethylketoximo)silane, methyltris(methylethylketoximo)silane, and vinyltris(methylethylketoximo) silane; alkyl orthosilicates such as tetraethyl orthosilicate, tetramethoxysilane, tetraethoxysilane, and condensation products of these orthosilicates, which are typically referred to as alkyl polysilicates; methylvinyl bis(n-methylacetamido) silane; and a combination thereof.

In certain embodiments, the amount of crosslinker (VI) utilized in the thermally conductive thermal radical cure silicone composition is dependent upon numerous factors, but is based primarily upon the type and amount of curable groups contained in components (I) and (II). In certain embodiments, the amount of crosslinker (VI) is from 0.1 to 50 weight percent, such as from 0.5 to 30 weight percent, based upon the total weight of component (VII) below.

Component (VII) of the thermally conductive thermal radical cure silicone composition is a moisture cure polymer that comprises an organopolysiloxane polymer of the formula: Component (VII) is a moisture cure polymer that comprises an organopolysiloxane polymer of the formula: $(OR^7)_{3-z}R^6_z Si\text{-}Q\text{-}(R^{25}_2 SiO_{2/2})_y\text{-}Q\text{-}SiR^6_z(OR^7)_{3-z}$, wherein each $R^{25}$ is independently a monovalent hydrocarbon radical having 1 to 6 carbon atoms, each $R^6$ independently is a monovalent hydrocarbon radical having 1 to 6 carbon atoms, each $R^7$ independently is selected from the group consisting of an alkyl radical and alkoxyalkyl radical, Q is a divalent linking radical, the subscript z has a value of 0, 1 or 2, and the subscript y has a value of 60 to 1000.

In certain embodiments, the moisture cure polymer (VI) is present in an amount ranging from 0.1 to 5 weight percent based on the weight of thermally conductive thermally radical cure adhesive composition.

The Q radical is a divalent linking radical linking the silicon atom of the curing radical to a silicon atom of the resin. Q is typically selected from the types of divalent radicals that are used to link silicon atoms in a hydrolytically stable manner and include, but are not limited to, hydrocarbons such as alkylene, for example ethylene, propylene, and isobutylene and phenylene; siloxanes such as, for example, polydimethylsiloxane; and combinations thereof. Preferably, the number of hydrocarbon radical units in the Q divalent linking radical numbers from 2 to 12, alternatively 2, and the number of siloxane radical units in the Q divalent linking radical numbers from 0 to 20, alternatively 2.

Component (VIII) of the thermally conductive thermal radical cure silicone composition is a solvent. Suitable solvents are exemplified by organic solvents such as toluene, xylene, acetone, methylethylketone, methyl isobutyl ketone, hexane, heptane, alcohols such as decyl alcohol or undecyl alcohol, and a combination thereof; and non-crosslinkable silicone solvents such as trimethylsiloxy-terminated polydimethylsiloxanes, trimethylsiloxy-terminated polymethylphenylsiloxanes, and a combination thereof. Examples of silicone solvents are known in the art and are commercially available, for example, as Dow Corning® OS Fluids from Dow Corning Corporation of Midland, Mich., U.S.A. The amount of component (VIII) may range from 0.001% to 90% based on the weight of thermally conductive thermally radical cure adhesive composition.

Component (IX) of the thermally conductive thermal radical cure silicone composition is an adhesion promoter. Examples of suitable adhesion promoters include an alkoxysilane such as an epoxy-functional alkoxysilane, or a mercapto-functional compound; a combination of an alkoxysilane and a hydroxy-functional polyorganosiloxane; a mercapto-functional compound; an unsaturated compound; an epoxy-functional silane; an epoxy-functional siloxane; a combination, such as a reaction product, of an epoxy-functional silane or epoxy-functional siloxane and a hydroxy-functional polyorganosiloxane; or a combination thereof. Suitable adhesion promoters are known in the art and are commercially available. For example, Silquest® A186 is beta-(3,4-epoxycyclohexyl)ethyltrimethoxysilane which is commercially available from Crompton OSi Specialties of Middlebury, Conn., USA. CD9050 is a monofunctional acid ester useful as an adhesion promoter that provides adhesion to metal substrates and is designed for radiation curable compositions. CD9050 is commercially available from Sartomer Co. SR489D is tridecyl acrylate, SR395 is isodecyl acrylate, SR257 is stearyl acrylate, SR506 is isobornyl acrylate, SR833S is tricyclodecane dimethanol diacrylate, SR238 is 1,6 hexanediol diacrylate, and SR351 is trimethylol propane triacrylate, all of which are also commercially available from Sartomer Co. The amount of adhesion promoter (IX) added to the composition depends on various factors including the specific adhesion promoter selected, the other components of the composition, and the end use of the composition, however, the amount may range from 0.01% to 5% based on the weight of thermally conductive thermally radical cure adhesive composition. Other suitable adhesion promoters, which are useful to promote adhesion to metals, include maleic anhydride, methacrylic anhydride, and glycidyl methacrylate.

Component (IX) can be an unsaturated or epoxy-functional compound. Suitable epoxy-functional compounds are known in the art and commercially available, see for example, U.S. Pat. Nos. 4,087,585; 5,194,649; 5,248,715; and 5,744,507 (at col. 4-5). Component (g) may comprise an unsaturated or epoxy-functional alkoxysilane. For example, the functional alkoxysilane can have the formula $R^{20}_v Si(OR^{21})_{(4-v)}$, where subscript v is 1, 2, or 3, alternatively v is 1.

Each $R^{20}$ is independently a monovalent organic group with the proviso that at least one $R^{20}$ is an unsaturated organic group or an epoxy-functional organic group. Epoxy-functional organic groups for $R^{20}$ are exemplified by 3-glycidoxypropyl and (epoxycyclohexyl)ethyl. Unsaturated organic groups for $R^{20}$ are exemplified by 3-methacryloyloxypropyl, 3-acryloyloxypropyl, and unsaturated monovalent hydrocarbon groups such as vinyl, allyl, hexenyl, undecylenyl.

Each $R^{21}$ is independently an unsubstituted, saturated hydrocarbon group of 1 to 4 carbon atoms, alternatively 1 to 2 carbon atoms. $R^{21}$ is exemplified by methyl, ethyl, propyl, and butyl.

Examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof. Alternatively, examples of suitable adhesion promoters include glycidoxypropyltrimethoxysilane and a combination of glycidoxypropyltrimethoxysilane with an aluminum chelate or zirconium chelate.

Component (IX) may comprise an epoxy-functional siloxane such as a reaction product of a hydroxy-terminated polyorganosiloxane with an epoxy-functional alkoxysilane, as described above, or a physical blend of the hydroxy-terminated polyorganosiloxane with the epoxy-functional alkoxysilane. Component (IX) may comprise a combination of an epoxy-functional alkoxysilane and an epoxy-functional siloxane. For example, component (VII) is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer. When used as a physical blend rather than as a reaction product, these components may be stored separately in multiple-part kits.

Suitable mercapto-functional compounds include an organomercaptan, a mercapto containing silane, or a combination thereof. Suitable mercapto containing silanes include 3-mercaptopropyltrimethoxysilane. Suitable mercapto-functional compounds are disclosed in U.S. Pat. No. 4,962,076. One skilled in the art would recognize that certain components described herein may be added to the composition for more than one or different purposes. For example, alkoxysilanes may be use as adhesion promoters, filler treating agents, and/or as crosslinking agents in condensation reaction curable silicone compositions.

Component (X) of the thermally conductive thermal radical cure silicone composition is a colorant (e.g., dye or pigment). Examples of suitable colorants include carbon black, Stan-Tone 40SP03 Blue (which is commercially available from PolyOne) and Colorant BA 33 Iron Oxide pigment (which is commercially available from Cathay Pigments (USA), Inc. Valparaiso, Ind. 46383 USA). Examples of colorants are known in the art and are disclosed in U.S. Pat. Nos. 4,962,076; 5,051,455; and 5,053,442. The amount of colorant added to the curable silicone composition depends on various factors including the other components of the composition, and the type of colorant selected, however, the amount may range from 0.001% to 20% based on the weight of the composition.

Component (XI) of the thermally conductive thermal radical cure silicone composition is a reactive diluent that is different than the silicone reactive diluent (III). Component (XI) may be diluent that reacts with a functional group on the thermally conductive clustered functional polyorganosiloxane (I). The reactive diluent may be a monofunctional reactive diluent, a difunctional reactive diluent, a polyfunctional reactive diluent, or a combination thereof. The reactive diluent (XI) selected will depend on various factors including the curable groups on on the thermally conductive clustered functional polyorganosiloxane (I). However, examples of suitable reactive diluents include an acrylate, an anhydride such as a maleic anhydride or methacrylic anhydride, an epoxy such as a monofunctional epoxy compound, a methacrylate such as glycidyl methacrylate, an oxetane, a vinyl acetate, a vinyl ester, a vinyl ether, a fluoro alkyl vinyl ether, a vinyl pyrrolidone such as N-vinyl pyrrolidone, a styrene, or a combination thereof.

Mono-functional acrylate and methacrylate esters are commercially available from companies such as Sartomer, Rohm Haas, Hitachi Chemical, Arkema, Inc., Cytec, Sans Ester Corp, Rahn, and Bomar Specialties Co. Specific examples include methyl acrylate; methyl methacrylate; ethyl acrylate; ethyl methacrylate; butyl acrylate; butyl methacrylate; cyclohexyl acrylate; hexyl acrylate; 2-ethylhexyl acrylate; isodecyl methacrylate; isobornyl methacrylate; hydroxyethyl methacrylate; hydroxypropyl acrylate; hydroxypropyl methacrylate; n-octyl acrylate; cyclohexyl methacrylate; hexyl methacrylate; 2-ethylhexyl methacrylate; decyl methacrylate; dodecyl methacrylate; lauryl acrylate; tert-butyl methacrylate; acrylamide; N-methyl acrylamide; diacetone acrylamide; N-tert-butyl acrylam ide; N-tert-octyl acrylam ide; N-butoxyacrylam ide; gam ma-methacryloxypropyl trimethoxysilane; dicyclopentadienyloxyethyl methacrylate; 2-cyanoethyl acrylate; 3-cyanopropyl acrylate; tetrahydrofurfuryl methacrylate; tetrahydrofurfuryl acrylate; glycidyl acrylate; acrylic acid; methacrylic acid; itaconic acid; glycidyl methacrylate; 1,12 dodecanediol dimethacrylate; 1,3-butylene glycol diacrylate; 1,3-butylene glycol dimethacrylate; 1,3-butylene glycol dimethacrylate; 1,4-butanediol diacrylate; 1,4-butanediol dimethacrylate; 1,4-butanediol dimethacrylate; 1,6 hexanediol diacrylate; 1,6 hexanediol dimethacrylate; alkoxylated cyclohexane dimethanol diacrylate; alkoxylated hexanediol diacrylate; alkoxylated neopentyl glycol diacrylate; cyclohexane dimethanol diacrylate; cyclohexane dimethanol dimethacrylate; diethylene glycol diacrylate; diethylene glycol dimethacrylate; dipropylene glycol diacrylate; ethoxylated bisphenol a diacrylate; ethoxylated bisphenol a dimethacrylate; ethylene glycol dimethacrylate; neopentyl glycol diacrylate; neopentyl glycol dimethacrylate; polypropylene glycoldimethacrylate; propoxylated neopentyl glycol diacrylate; propoxylated neopentyl glycol diacrylate; tricyclodecane dimethanol diacrylate; triethylene glycol diacrylate; trimethylolpropane triacrylate; trimethylolpropane trimethacrylate; tris (2-hydroxy ethyl) isocyanurate triacrylate; tris (2-hydroxy ethyl) isocyanurate triacrylate; n,n'-m-phenylenedimaleimide; triallyl cyanurate; triallyl isocyanurate; metallic diacrylate; metallic dimethacrylate; metallic monomethacrylate; metallic diacrylate (difunctional); metallic dimethacrylate (difunctional); triethoxysilylpropyl methacrylate; tributoxysilylpropyl methacrylate; dimethoxymethylsilylpropyl methacrylate; diethoxymethylsilylpropyl methacrylate; dibutoxymethylsilylpropyl methacrylate; diisopropoxymethylsilylpropyl methacrylate; dimethoxysilylpropyl methacrylate; diethoxysilylpropyl methacrylate; dibutoxysilylpropyl methacrylate; diisopropoxysilylpropyl methacrylate; trimethoxysilylpropyl acrylate; triethoxysilylpropyl acrylate; tributoxysilylpropyl acrylate; dimethoxymethylsilylpropyl acrylate; diethoxymethylsilylpropyl acrylate; dibutoxymethylsilylpropyl acrylate; diisopropoxymethylsilylpropyl acrylate; dimethoxysilylpropyl acrylate; diethoxysilylpropyl acrylate; dibutoxysilylpropyl acrylate; and diisopropoxysilylpropyl acrylate.

Examples of suitable vinyl ethers include, but are not limited to butanediol divinyl ether, cyclohexanedimethanol divinyl ether, cyclohexanedimethanol monovinyl ether, cyclohexyl vinyl ether, diethyleneglycol divinyl ether, diethyleneglycol monovinyl ether, dodecyl vinyl ether, ethyl vinyl ether, hydroxybutyl vinyl ether, isobutyl vinyl ether, isopropyl vinyl ether, n-butyl vinyl ether, n-propyl vinyl ether, octadecyl vinyl ether, triethyleneglycol divinyl ether, and combinations thereof. Vinyl ethers are known in the art and commercially available from BASF AG of Germany, Europe. The amount of component (IX) depends on various factors such as the specific reactive diluent selected, but the amount may range from 0.01 to 10% based on the weight of thermally conductive thermally radical cure adhesive composition. One skilled in the art would recognize that some of the reactive diluents described herein (such as the difunctional and polyfunctional acrylates and methacrylates) may also be used in addition to, or instead of, the reactive species described above as component c) of (I).

Component (XII) of the thermally conductive thermal radical cure silicone composition is a corrosion inhibitor. Examples of suitable corrosion inhibitors include benzotriazole, mercaptabenzotriazole, mercaptobenzothiazole, and commercially available corrosion inhibitors such as 2,5-dimercapto-1,3,4-thiadiazole derivative (CUVAN® 826) and alkylthiadiazole (CUVAN® 484) from R. T. Vanderbilt. The amount of component (XII) may range from 0.05% to 0.5% based on the weight of thermally conductive thermally radical cure adhesive composition.

Component (XIII) of the thermally conductive thermal radical cure silicone composition is a polymerization inhibitor. Examples of suitable polymerization inhibitors for acrylate and methacrylate curable groups include, but are not limited to: 2,6,-Di-tert-butyl-4-(dimethylaminomethyl)phenol (DBAP), hydroquinone (HQ); 4-methoxyphenol (MEHQ); 4-ethoxyphenol; 4-propoxyphenol; 4-butoxyphenol; 4-heptoxyphenol; butylated hydroxytoluene (BHT); hydroquinone monobenzylether; 1,2-dihydroxybenzene; 2-methoxyphenol; 2,5-dichlorohydroquinone; 2,5-di-tert-butylhydroquinone; 2-acetylhydroquinone; hydroquinone monobenzoate; 1,4-dimercaptobenzene; 1,2-dimercaptobenzene; 2,3,5-trimethylhydroquinone; 4-aminophenol; 2-aminophenol; 2-N, N-dimethylaminophenol; 2-mercaptophenol; 4-mercaptophenol; catechol monobutylether; 4-ethylaminophenol; 2,3-dihydroxyacetophenone; pyrogallol-1, 2-dimethylether; 2-methylthiophenol; t-butyl catechol; di-tert-butylnitroxide; di-tert-amylnitroxide; 2,2,6,6-tetramethyl-piperidinyloxy; 4-hydroxy-2,2,6,6-tetramethyl-piperidinyloxy; 4-oxo-2,2,6,6-tetramethyl-piperidinyloxy; 4-dimethylamino-2,2,6,6-tetramethyl-piperidinyloxy; 4-amino-2,2,6,6-tetramethyl-piperidinyloxy; 4-ethanoloxy-2,2,6,6-tetramethyl-piperidinyloxy; 2,2,5,5-tetramethyl-pyrrolidinyloxy; 3-amino-2,2,5,5-tetramethyl-pyrrolidinyloxy; 2,2,5,5-tetramethyl-1-oxa-3-azacyclopentyl-3-oxy; 2,2,5,5-tetramethyl-3-pyrrolinyl-1-oxy-3-carboxylic acid; 2,2,3,3,5,5,6,6-octamethyl-1,4-diazacyclohexyl-1,4-dioxy; salts of 4-nitrosophenolate; 2-nitrosophenol; 4-nitrosophenol; copper dimethyldithiocarbamate; copper diethyldithiocarbamate; copper dibutyldithiocarbamate; copper salicylate; methylene blue; iron; phenothiazine (PTZ); 3-oxophenothiazine; 5-oxophenothiazine; phenothiazine dimer; 1,4-benzenediamine; N-(1,4-dimethylpentyl)-N'-phenyl-1,4-benzenediamine; N-(1,3-dimethylbutyl)-N'-phenyl-1,4-benzenediamine; N-nitrosophenylhydroxylamine and salts thereof; nitric oxide; nitrobenzene; p-benzoquinone; pentaerythrityl tetrakis(3-laurylthiopropionate); dilauryl thiodipropionate; distearyll thiodipropionate; ditridecyl thiodipropionate; tetrakis[methylene 3-(3, 5-di-tert-butyl-4-hydroxyphenyl)propionate]methane; thiodiethylene bis[3-(3,5-di-tert-butyl-4-hydroxyphenyl) propionate]; octadecyl-3-(3,5-di-tert-butyl-4-hydroxyphenyl) propionate; isotridecyl-3-(3,5-di-tert-butyl-4-hydroxyphenyl) propionate; N,N'-hexamethyl (3,5-di-tertbutyl-4-hydroxyhydrocinnamamide); iso-octyl-3-(3,5-di-tert-butyl-4-hydroxyphenyl) propionate; 2,2'-ethylidenebis-(4,6-di-tert-butylphenol); 1,3,5-trimethyl-2,4,6-tris(3,5-di-tert-butyl-4-hydroxybenzyl) benzene; 4,6-bis(octylthiomethyl)-o-cresol; triethylene glycol-bis-3-(3-tert-butyl-4-hydroxy-5-methylphenyl)propionate; tris-(3,5-di-tert-butylhydroxybenzyl) isocyanurate; tris(2,4-di-tert-butylphenyl) phosphate; distearyl pentaerythritol diphosphite; bis(2,4-di-tert-butyl phenyl)pentaerythritol diphosphite; 2,5-di-tert-amyl-hydroquinone; or isomers thereof; combinations of two or more thereof; or combinations of one or more of the above with molecular oxygen. When present, the polymerization inhibitor may be added to the curable silicone composition in an amount ranging from 100 ppm to 4,000 ppm. Polymerization inhibitors are known in the art and are disclosed, for example in EP 1 359 137.

Component (XIV) of the thermally conductive thermal radical cure silicone composition is an acid acceptor. The acid acceptor may comprise a metal oxide such as magnesium oxide. Acid acceptors are known in the art and are commercially available under tradenames including Rhenofit F, Star Mag CX-50, Star Mag CX-150, BLP-3, and MaxOx98LR. Rhenofit F was calcium oxide from Rhein Chemie Corporation of Chardon, Ohio, USA. Star Mag CX-50 was magnesium oxide from Merrand International Corp. of Portsmouth, N.H., USA. MagOX 98LR was magnesium oxide from Premier Chemicals LLC of W. Conshohocken, Pa., USA. BLP-3 was calcium carbonate was Omya Americas of Cincinnati, Ohio, USA.

The thermally conductive thermal radical cure silicone compositions of the present invention, as noted above, are preferably formed in a method known the "In Situ Method".

In the In Situ Method, in one embodiment, the silicone reactive diluent (III) is premade (in accordance with any possible embodiment described above) and introduced as an optional component during the method described below, while the thermally conductive clustered functional polyorganosiloxane (I) is made during the process.

In Step 1 of the process, a masterbatch is formed in a vessel that includes the filler (f) and a polyorganosiloxane having an average, per molecule, of at least 2 aliphatically unsaturated organic groups (i.e., component (a) of the thermally conductive clustered functional polyorganosiloxane (I), described above). The mixture may be sheared at room temperature to homogeneity.

The filler (f) for Step 1) includes a thermally conductive filler and can be one size or can be the combination of differing particle size and different particle size distribution.

In certain embodiments, the majority of the filler (f) added in this first step are larger surface area particles (i.e., those having an average surface area of 0.5 $m^2$/gram or greater).

Next, in Step 2, a filler treating agent (g) is added to the mixture and sheared at room temperature to homogeneity. Alternatively, the filler treating agent (g) may be added concurrently to the filler (f) and polyorganosiloxane (a) in Step 1.

Next, in Step 3, the mixture is heated to a temperature sufficient to insure the in situ treating of the thermally conductive fillers with the filler treating agent (g) in the presence of the polyorganosiloxane (a). The treating reaction may be initiated by raising the temperature to a range of 50° C. to 300° C., alternatively to a range of 100° C. to 150° C.

Next, in Step 4, the reaction product of Step 3 is cooled to below 30° C., such as to 10 to 15° C., wherein it is mixed with the rest of the components that comprise the thermally conductive clustered functional polyorganosiloxane (I), namely, the polyorganohydrogensiloxane having an average of 4 to 15 silicon atoms per molecule (component (b)), the reactive species having, per molecule, at least 1 aliphatically unsaturated organic group and 1 or more curable groups (component (c)) the hydrosilylation catalyst (component (d), and the isomer reducing agent (component (e). In certain embodiments, a polymerization inhibitor (XIII) may be added as a part of Step 4.

Next, in Optional Step 5, the processes described above may further comprise the steps of adding a catalyst inhibitor, such as the catalyst inhibitor e) described above with respect to the method for forming silicone reactive diluent (III) in the first embodiment, to deactivate the hydrosilylation catalyst after Step 4, and purifying the product of step 4.

Next, in Step 6, the resulting mixture of Step 4 or Step 5 may be sheared at room temperature.

In Step 7, the clustered functional reaction may then be initiated by raising the temperature of the mixture to 50° C. to 100° C., alternatively 70° C. to 85° C., and maintaining the temperature until substantially all of the SiH of the mixture of Step 4 has reacted, as measured by the time needed for the SiH peak as observed by Fourier Transform Infra Red spectroscopy (FT-IR) at about 2170 $cm^{-1}$ to be reduced into the background of the spectra.

After completion of Step 7, in Step 8, the mixture is cooled to below 50° C., wherein optionally the silicone reactive diluent (III) is added to the mixture. In addition, other optional components, including additional filler (f), additional filler treating agent (g), or a combination thereof may also be introduced in Step 8 and the resultant mixture is mixed to homogeneity.

The filler (f) introduced in Step 8 includes a thermally conductive filler and can be one size or can be the combination of differing particle size and different particle size distribution, including larger surface area particles particles (i.e., those having an average surface area of 0.5 $m^2$/gram or greater) and smaller surface area particles (i.e., those having an average surface area of less than 0.5 $m^2$/gram).

In addition, the filler (f) introduced during Step 8 can have alkylthiols such as octadecyl mercaptan and others, and fatty acids such as oleic acid, stearic acid, titanates, titanate coupling agents, zirconate coupling agents, and a combination thereof. Stated another way, the filler (f) introduced Step 8 is hereinafter referred to a "dirty filler." Conversely, the filler (f) added in Step 1 is not a "dirty filler", but is a purer form of the filler that does not include alkylthiols such as octadecyl mercaptan and others, and fatty acids such as oleic acid, stearic acid, titanates, titanate coupling agents, zirconate coupling agents, and a combination thereof. Stated another way, the filler of Step 1 is a highly pure filler.

Next, in Step 9, the mixture can be maintained at room temperature or heated to an elevated temperature 50° C. to 110° C., alternatively 70° C. to 85° C., in order to treat any additional filler added in Step 8.

In certain embodiments, Steps 8 and 9 can be repeated until a desired thermally conductive filler loading level for the silicone composition is achieved.

Next, in Step 10, the temperature of the reaction vessel is cooled and any one or more of the additional components (III)-(XIV) are blended with the resultant mixture and mixed to homogeneity. In certain embodiments, the temperature is cooled to below 50° C. prior to the addition of the additional components (III)-(XIV). Each of the additional components (III)-(XIV) may be added to the vessel sequentially, or all at once, or in sequential groups.

Finally, in Step 11, the temperature is cooled to below 30° C. and the radical initiator (II) is added to the mixture and mixed to homogeneity to form the thermally conductive thermal radical cure adhesive composition. Alternatively, in certain embodiments, the radical initiator (II) may be added as a part of Step 10 when the temperature is below 30° C.

The resultant thermally conductive thermal radical cure silicone composition formed in accordance with the In Situ Method achieved a thermal conductivity greater than 0.5 W/mK (watts per meter Kelvin), alternatively greater than 1 W/mK, alternatively greater than 1.5 W/mK.

The thermally conductive thermal radical cure silicone composition formed by the In Situ Method as described above, and cured silicone coatings prepared by curing the resultant thermally conductive thermal radical cure adhesive composition, are useful in electronics applications, including both microelectronics and macroelectronics applications as well as optoelectronics applications and thermally conductive electronics applications, such as making thermally conductive adhesives. As the thermally conductive thermal radical cure silicone compositions of the present invention are cured both thermal radical cure and moisture cure, they may be utilized on a wider variety of substrates than traditional radical cure adhesive compositions or moisture cure adhesive compositions.

Cured silicone adhesives prepared from such a thermally conductive thermal radical cure silicone composition may adhere to various electronics substrates, including metals such as aluminum, copper, and electroless nickel; as well as polymeric substrates such as FR4, Nylon, polycarbonate, Lucite (which is polymethylmethacrylate, PMMA), polybutylene terephthalate (PBT), and Solvay liquid crystal polymers.

Composite articles according to the invention preferably consist of the afore-mentioned thermally conductive thermal radical cure silicone compositions, and can be disposed or applied to a single substrate or between multiple substrates. At least one surface of the substrate to which the thermally conductive thermal radical cure silicone compositions is applied should have a polymeric or largely inorganic surface. Any additional substrates can be organic, thermoplastic, thermosetting, metal, ceramic, or another suitable inorganic material. The substrate(s) can be multi-layered such as a printed circuit board in which case there is obtained improved adhesion between the thermally conductive thermal radical cure silicone compositions and the substrate or substrates of the composite article.

Composite articles are made by bonding the thermally conductive thermal radical cure silicone compositions to at least one surface of the substrate in the composite article. This is carried out by curing the composition at temperatures below 150° C., alternatively at 70-100° C., and achieving sufficient adherence such that the conductive curable composition and the substrate are bonded together securely to form the composite article.

When the polymeric substrate is a material such as glass reinforced polybutylene terephthalate (PBT), the upper temperature for curing the curable composition on the surface of the substrate may be less than 80° C. For maximum benefit, the temperature should range from −40° C. to 80° C., alternatively from 0° C. to 60° C., alternatively from 25° C. to 60° C. The time for curing the composition on the substrate can range from 5 seconds to 24 hours, alternatively from 30 seconds to 2 hours. This will assure that the composition is fully cured and fully adhered to the substrate. The curable composition can be applied to a substrate by meter mixing, extruding, and/or using robotic or manual application.

Fully bonded composite articles can be made by disposing the conductive curable composition onto at least one surface of the polymeric substrate at a temperature less than the boiling point of water (100° C.), and then concurrently curing the thermally conductive thermal radical cure silicone compositions and bonding it to the polymeric substrate(s). This obviates the need to pre-dry the substrate(s). Composite articles can also be cured and bonded in a similar fashion at room temperature that eliminates the need to use a curing oven.

Mixing and dispensing of multi-component compositions can be carried out in several ways. For example, the compositions can be mixed at the desired volume ratio in air in a bag or through a pressurized gun. It is beneficial to tailor the viscosity and density of thermally conductive thermal radical cure silicone compositions to allow for their efficient mixing and dispensing. Fillers of varying density and viscosity modifiers such as solvents, monomers, and polymers can be used to impart control of these properties. It is also beneficial to exclude oxygen from the environment in the mixing device before dispensing it on a substrate to minimize pre-mature curing and plugging of the mixing and dispensing device.

The thermally conductive thermal radical cure silicone compositions of the invention are useful for preparing electrically conductive rubbers, electrically conductive tapes, electrically conductive curable adhesives, electrically conductive foams, and electrically conductive pressure sensitive adhesives. The thermally conductive thermal radical cure silicone compositions are especially useful for preparing electrically conductive silicone adhesives. Electrically conductive silicone adhesives have numerous uses including die attach adhesives, solder replacements, and electrically conductive coatings and gaskets. In particular, electrically conductive silicone adhesives are useful for bonding electronic components to flexible or rigid substrates.

The thermally conductive thermal radical cure silicone compositions can also be used for the assembly of electronic components, as substitutes for soldering, as electrical and thermal interface materials, and as conductive inks. The thermally conductive thermal radical cure silicone compositions can be in the form of a rigid part or a flexible elastomer, and can be dispensed, pre-cured in rolls or sheet form as films, such as pressure sensitive adhesives. They can also be dispensed and cured in place in the final application. Foamed thermally conductive thermal radical cure silicone compositions can be used as gaskets and seals in applications such as electrical and electronic housings to prevent the transmission of electromagnetic and radio frequency noise across the sealed areas.

The thermally conductive thermal radical cure silicone compositions are similarly useful for preparing thermally conductive rubbers, thermally conductive tapes, thermally conductive curable adhesives, thermally conductive foams, and thermally conductive pressure sensitive adhesives. The thermally conductive thermal radical cure silicone compositions are especially useful for preparing thermally conductive silicone adhesives. Thermally conductive thermal radical cure silicone compositions have several uses including their use as die attach adhesives, solder replacements, and thermally conductive coatings and gaskets. Thermally conductive thermal radical cure silicone compositions are especially useful for bonding electronic components to flexible or rigid substrates.

Thermally conductive thermal radical cure silicone compositions can also be used for assembling electronic components, as substitutes for soldering, as thermal interface materials, and as thermally conductive inks or greases. The thermally conductive thermal radical cure silicone compositions can be in the form of a rigid part or in the form of a flexible elastomer and can be dispensed, pre-cured in rolls or in sheets as films, such as pressure sensitive adhesives. They can also be displaced and cured in place in the final application. Partially cured thermally conductive thermal radical cure silicone compositions can be used as thermally conductive greases. Foamed thermally conductive thermal radical cure silicone compositions can be used as gaskets and seals in electrical and electronic housings. When the thermally conductive thermal radical cure silicone composition is a thermally conductive adhesive, the conductive curable composition offers particular advantages as a thermal interface material to provide good bonding strength between heat sinks, heat spreaders, or heat dissipation devices, particularly where the heat sink or heat dissipation device has a polymeric-matrix.

So that those skilled in the art can understand and appreciate the invention taught herein, the following examples are presented, it being understood that these examples should not be used to limit the scope of this invention found in the claims attached hereto. All parts and percentages in the examples are on a weight basis and all measurements were obtained at 25° C., unless indicated to the contrary.

Comparative Examples

These examples are intended to illustrate the invention to one of ordinary skill in the art and should not be interpreted as limiting the scope of the invention set forth in the claims.

NMR:

Solution-state $^{29}$Si- and $^{13}$C-NMR spectra were recorded on a Mercury VX 400 MHz spectrometer at room temperature (20-22° C.) using CDCl3 (Isotec) in a 16 mm Si-free probe. Cr(acac)$_3$ (Chromium acetylacetonoate) (20 mM) was added to NMR samples as a relaxation agent. $^{29}$Si NMR spectra were acquired at 79.493 MHz and processed with 5 Hz of Lorentzian line broadening. The spectra were only semiquantitative due to the long relaxation times of the $^{29}$Si nucleus, but relative comparison of spectra acquired under identical conditions was considered quantitative. $^{13}$C NMR spectra were acquired at 100.626 MHz and processed with 3 Hz of Lorentzian line broadening. For both nuclei, 256-512 scans with a 90° pulse width were typically co-added to achieve adequate sensitivity; a 6-second ($^{29}$Si) or 12-second (13C) delay between pulses was used. Gated decoupling was used to remove negative nuclear Overhauser effects. Chemical shifts were referenced to external tetramethylsilane (TMS).

I. List of Components for Examples

DOW CORNING® SFD-119; 0.46 wt % vinyl linear polydimethylsiloxane;

DOW CORNING® SFD-117; 0.2 wt % vinyl linear polydimethylsiloxane;

DOW CORNING® SFD-120; 0.13 wt % vinyl linear polydimethylsiloxane;

DOW CORNING® SFD-128; 0.088 wt % vinyl linear polydimethylsiloxane;

DOW CORNING® Q2-5057S; 0.15 wt % SiH methylhydrogen silicone, linear;

DOW CORNING® Q2-556S; 0.027 wt % SiH methylhydrogen silicone, linear;

Methylhydrogensiloxane; 1.67 wt % SiH methylhydrogen silicone cyclic;

DOW CORNING® 2-0707; Platinum catalyst 0.52 wt % Platinum;

MB2030—(DOW CORNING® SFD-128/silica blend);

Methyltrimethoxysilane (MTM); DOW CORNING® Z6070;

OFS-1579/ETS900—Mixture of methyl and ethyltriacetoxysilane;

DOW CORNING® Z-6030 SILANE Methacryloxypropyltrimethoxysilane;

DOW CORNING® Z-2306 SILANE Isobutyltrimethoxysilane (IBTMS);

DOW CORNING® Z-6341 SILANE n-octyltriethoxysilane (nOTE);

Diallyl Maleate (DAM) available from from Bimax Inc. of Glen Rock, Pa.;

Allyl methacrylate (AMA) available from BASF Corporation of Florham Park, N.J.

Butylated Hydroxy Toluene (BHT) available from from Sigma Aldrich of Milwaukee, Wis.;

Magnesium oxide (MAGOX SUPER PREMIUM); available from Premier Magnesia, W. Conshohocken, Pa. 19428 USAA;

DAW-45; aluminum oxide filler commercially available from Denka;

AL-43-ME; aluminum oxide filler commercially available from Showo-Denko;

CB-A20S; aluminum oxide filler commercially available from Showo-Denko;

Varox® DCBP-50 Paste; available from R T Vanderbilt Co., Norwalk Conn. 06856 USA;

Perkadox L-50-PS; a product of Azko Nobel Polymer LLC, Chicago Ill. USA;

TAIC; triallylisocyanurate from Sigma-Aldrich Corp. St. Louis, Mo., USA;

TYZOR TNBT; available from Dorf Ketal Speciality Catalysts, LLC, 3727 Greenbriar Dr., Stafford, Tex. 77477 USA;

TINOPAL OB, Optical brightener from BASF Corporation 100 Campus Drive Florham Park, N.J. 07932. USA;

DOW CORNING® TC 1-4173 is a 1-part platinum addition-cured thermally conductive adhesive.

II. Impact of Isomer Reducing Agent on A Silicone Reactive Diluent (Samples 1 and 2)

In a 50 liter Turello mixer, 6196.7 g of chain extender Q2-5567S, 1.3 g of BHT, and 318.69 g of AMA were loaded. The mixture was inerted using 2% oxygen in nitrogen atmosphere and stirred for 10 minutes, at which point 6.64 g of a platinum catalyst was added. The mixture was stirred for 10 additional minutes before setting the temperature at 50° C. The temperature was held for 30 minutes at 50° C. before adding 9.96 g of DAM. The mixture was stirred for 10 additional minutes. The temperature was held for 30 minutes at 50° C. at a vacuum of 75 Torr. The resutant composition (Sample 1) was cooled to less than 30° C. before packaging.

In a 50 liter Turello mixer, 6196.7 g of chain extender Q2-5567S, 1.3 g of BHT, 318.69 g of AMA, and 1.3 g of OFS-1579 isomer reducing agent were loaded. The mixture was inerted using 2% oxygen in nitrogen atmosphere and stirred for 10 minutes, at which point 6.64 g of a platinum catalyst was added. The mixture was stirred for 10 additional minutes before setting the temperature at 50° C. The temperature was held for 30 minutes at 50° C. before adding 9.96 g of DAM. The mixture was then stirred for 10 additional minutes. The temperature was held for 30 minutes at 50° C. at a vacuum of 75 Torr. The resutant composition (Sample 2) was cooled to less than 30° C. before packaging.

Samples 1 and 2 were measured for viscosity (in centipoises (cps)) using a Brookfield LVF viscometer at 60 revolutions per minute using a #3 spindle. The results, as shown in Table 3, indicate that the introduction of the isomer reducing agent (Sample 2) provided a relatively stable viscosity over a 90 days period, while the viscosity of the corresponding example (Sample 1) without the isomer reducing agent increased to almost double the viscosity after 90 days.

TABLE 1

| Days of aging | Initial | 91 |
|---|---|---|
| Sample 1 | 240 cp | 400 cp |
| Sample 2 | 250 cp | 250 cp |

III. Preparation of Thermally Conductive Thermal Radical Cure Silicone Adhesive

A: Preparation of Thermally Conductive Clustered Functional Polyorganosiloxane (TC CFP) with Isomer Reducing Agent In a 1 quart Gallon Baker Perkin mixer, 133.2 g of DOW CORNING® SFD120 polymer, 991 g of Al-43-ME (Al2O3 filler), 99.1 g of DAW-45 (Al2O3 filler) and 35.8 g of DOW CORNING® Z-6341 (filler treat agent) were loaded. During the loading, Al-43-ME and Z-6341 were loaded in 3 steps to reach the total amount described above. In between the 3-step loadings, there was 2-5 mins mixing at room temperature to mesh in the fillers. After all material (described above) added in the mixer, the mixture was blended for 20 minutes before setting the temperature at 149° C. The temperature was held for 30 minutes at 149° C. with a vacuum and N2. The mixture was then cooled to lower than 30° C. A homogenized premixture of 3.93 g of cyclic methylhydrogensiloxane, and 7.94 g of chain extender Q2-5057S, 0.025 g of BHT, 12.25 g of AMA, and 0.025 g of OFS-1579 isomer reducing agent were loaded. The mixture was blended for an additional 10 minutes at room temperature, at which point 0.18 g of a platinum catalyst was added. The mixture was blended for 10 additional minutes before setting the temperature at 80° C. The temperature was held for 30 minutes at 80° C. before cooling to lower than 50° C. and adding 0.27 g of DAM. The mixture was blended for 5 additional minutes before setting the temperature at 50° C. The temperature was held for 15 minutes at 50° C. and a vacuum. The mixture was then cooled to less than 35° C. before packaging. The resultant polymer is hereinafter referred to as TC CFP.

B. Synthesis Silicone Reactive Diluent (SRD-1)

In a 50 liter Turello mixer, 6196.7 g of chain extender Q2-5567S, 1.3 g of BHT, 318.69 g of AMA, and 1.3 g of OFS-1579 isomer reducing agent were loaded. The mixture was inerted using 2% oxygen in nitrogen atmosphere and stirred for 10 minutes, at which point 6.64 g of a platinum catalyst was added and the mixture. The mixture was stirred for 10 additional minutes before setting the temperature at 50° C. The temperature was held for 30 minutes at 50° C. before adding 9.96 g of DAM. The mixture was stirred for 10 additional minutes. The temperature was held for 30 minutes at 50° C. and a vacuum of 75 Torr. The mixture was then cooled to less than 35° C. The resultant polymer is hereinafter referred to as SRD-1.

C. Preparation of Thermally Conductive Adhesives (TCA)

599 g of TC CFP, 645.9 g of DAW-45 (Al2O3 filler), 3.5 g of MgO2 and 134.3 g of SRD-1 were added in a 1 quart Gallon Baker Perkin mixer. The mixture (M-5) was mixed for 30 minutes at room temperature (<30° C.) with a vacuum. Adhesive compositions were prepared by further adding promoter packages and radical initiators as provided in Table 2 below.

TABLE 2

| Thermally conductive adhesive (TCA) formulation (unit in gram) | |
|---|---|
| M-5 | 1382.7 |
| Z-6030 Silane[1] | 7 |
| Z-6040 | |
| TAIC | |
| Z-2306 Silane[2] | 2.07 |
| TYZOR TNBT[3] | 0.69 |
| Allyl Methacrylate | 0.45 |
| Varox DCBP-50 Paste | 7 |

IV. Evaluation of Physical Properties of Adhesive Composition

Viscosity measurement on TCA formulations: In the following examples, a Brooksfield cone and plane viscometer (DV-II, spindle #52, speed 2 rpm) and a Brooksfield RVF viscometer (spindle #7, speed 2 rpm (low shear) and 20 rpm (high shear)) were utilized to determine the viscosity of the various thermally conductive adhesive formulations.

Sample Preparation on Alclad™ Panels:

1"×3" Al Alclad™ Panels (available from Alcoa) were cleaned with acetone (3 samples prepared). Bondlines were established using Spheriglass spacer beads (Potters Industries Inc. 350 North Baker Drive, Canby, Oreg. 97013-0607) appropriate with the application (i.e, 23 mil).

Next, the adhesives were applied to Alclad™ aluminum substrates. Two ⅜" binder clip were used with spacer methods to secure substrates during cure. The Cure condition was 30 minutes at 85° C. One half of the samples were evaluated at room temperature and aged, while the remaining samples were placed in 150° C. oven for 3 days.

Testing was carried out on Instron 5566 tensiometer at 2 inches per minute (Instron Worldwide Headquarters, 825 University Ave, Norwood, Mass. 02062-2643). The lap shear adhesive properties of the coated substrates were evaluated for peak stress, in pounds per square inch (PSI), with the results summarized in Table 6-8 below.

Prepare Thermally Conductive Adhesive (TCA) Formulation Samples for Physical Test and Thermal Conductivity:

TCA material in dental cup was removed from freezer and allowed to warm up to near room temp for at least one hour. Cup of material then placed in chamber and full vacuum was pulled for 15 minutes. Approximately 56-58 g of material was then poured carefully into 4"×4"×0.075" chase to try and minimize introduction of air into material. The chase was used along with Teflon sheets on each side to help with the release of material and to produce smooth surfaces, and two backing plates to help shape the slab. The chase, between the two backing plates was then placed into the Dake hot press at 85° C. and 10 tons of force for 30 minutes.

After cure, material was removed from the hot press and allowed to cool to room temperature. Then the slab of material was trimmed around the edges and removed from the chase. From this slab, using a "dogbone" shaped cutter and press, 5 samples were cut for tensile and elongation testing. Three (labeled RT samples) were tested 24 hours after cure. The remaining two samples were exposed to 150° C. for 3 days before testing and were labeled TRT samples.

The Instron T2000 tensometer was used to perform the physical testing, with the test program titled "Standard Tensile Test". Then used the leftovers from the slab (pieces that were not pulled) for Durometer and thermal conductivity measurement. The stack of three pieces reached 6 mm thickness (ref as the stack). For Shore A Durometer, 5 readings were taken. For HotDisk thermal tester (TPS 2500S Therm Test Inc), two stacks were placed on the top and bottom of thermal test probe. The measurement was taken with the setting as output powder 0.25 w and time measure 10 s.

TABLE 3

| Viscosity (before cure) | | |
|---|---|---|
| | Viscosity at low shear | Viscosity at high shear |
| TCA from M-5 in Table 2 | 220e3 cp | 76e3 cp |
| Dow Corning ® TC 1-4173 | 230e3 cp | 63e3 cp |

As Table 3 confirms, the adhesive composition (Table 2 Adhesives) according to the present invention exhibited similar rheology properties were achieved by compositions of the invention.

TABLE 4

| Properties after cure | | |
|---|---|---|
| | TCA from M-5 in Table 2 | Dow Corning ® TC 1-4173 |
| Cure condition | 85° C. for 30 mins | 150° C. for 30 mins |
| Thermal conductivity (W/mK) | 1.87 | 1.81 |
| Shore A Durometer | 91 | 92 |
| Elongation, % | 24.9 | 31.7 |
| Tensile Strength, psi | 713 | 714 |
| Lap shear to Alclad ™ Al, psi | 619 | 579 |
| percentage cohesive failure after lap shear pull | 80% | 100% |

As Table 4 confirms, the adhesive composition (Table 2 Adhesives) according to the present invention exhibited >1.5 W/mK thermal conductivity, adequate physical properties in terms of Durometer hardness, tensile strength, elongation, and lap shear on Alclad™ Al substrates. In addition, the adhesive composition (Table 2 Adhesives) according to the present invention cured at lower temperatures (actual cure condition or bond line cure condition) than platinum catalyzed addition chemistry adhesive systems. The introduction of silicone reactive diluents to the adhesive formulation retained the cure profile at low temperature 85° C. for 30 mins.

The instant disclosure has been described in an illustrative manner, and it is to be understood that the terminology which has been used is intended to be in the nature of words of description rather than of limitation. Obviously, many modifications and variations of the instant disclosure are possible in light of the above teachings. It is, therefore, to be understood that within the scope of the appended claims, the instant disclosure may be practiced otherwise than as specifically described.

The invention claimed is:

1. A method for forming a thermally conductive thermal radical cure silicone composition, the method comprising:
   (a) forming a thermally conductive clustered functional polymer comprising the reaction product of a reaction of:
      a polyorganosiloxane having an average, per molecule, of at least 2 aliphatically unsaturated organic groups,
      a polyorganohydrogensiloxane having an average of 4 to 15 silicon atoms per molecule,
      a reactive species having, per molecule, at least 1 aliphatically unsaturated organic group and 1 or more thermal radical curable groups,
      in the presence of a filler treating agent, a filler comprising a thermally conductive filler, an isomer reducing agent, and a hydrosilylation catalyst; and
   (b) blending the thermally conductive clustered functional polymer with a radical initiator to form the thermally conductive thermal radical cure silicone composition, wherein forming the thermally conductive clustered functional polymer of (a) comprises:
   (c) forming a first mixture comprising a thermally conductive filler, a filler treating agent, and a polyorganosiloxane having an average, per molecule, of at least 2 aliphatically unsaturated organic groups;
   (d) heating the first mixture to a temperature from 50° C. to 300° C. to treat the thermally conductive filler with the filler treating agent in the presence of the polyorganosiloxane;
   (e) cooling the first mixture to a temperature below 30° C.;
   (f) introducing the following components to the first mixture to form a second mixture:
      a polyorganohydrogensiloxane having an average of 4 to 15 silicon atoms per molecule
      a reactive species having, per molecule, at least 1 aliphatically unsaturated organic group and 1 or more thermal radical curable groups,
      an isomer reducing agent, and
      a hydrosilylation catalyst;
   (g) shearing the second mixture; and
   (h) heating the second mixture to a temperature ranging from 50° C. to 100° C. for a sufficient time such that substantially all of the Si—H groups of the second mixture have reacted.

2. The method according to claim 1 further comprising:
   (i) cooling the second mixture to below 50° C.;
   (j) mixing a silicone reactive diluent and an additional amount of the thermally conductive filler and an additional amount of filler treating agent with the thermally conductive clustered functional polymer after step (i) and prior to step (b) to form a third mixture;
   (k) heating the third mixture to a temperature from 50° C. to 110° C. to in situ treat the additional amount of thermally conductive filler with the additional amount of filler treating agent in the presence of the silicone reactive diluent.

3. The method according to claim 2, wherein the silicone reactive diluent comprises the reaction product of a reaction of:
   a) a polyorganohydrogensiloxane having an average of 10 to 200 silicon atoms per molecule, and
   b) a second reactive species having, per molecule, at least 1 aliphatically unsaturated organic group and 1 or more curable groups,
   in the presence of c) a second isomer reducing agent and d) a second hydrosilylation catalyst and e) inhibitor for the second hydrosilylation catalyst.

4. The method according to claim 2, wherein the silicone reactive diluent comprising the reaction product of a reaction of:
a) a siloxane compound according to the formula:

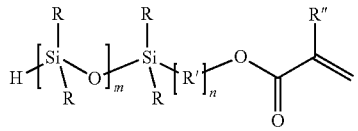

wherein:
R is a monovalent hydrocarbon having 1 to 6 carbon atoms,
R' is a monovalent hydrocarbon having 3 to 12 carbon atoms,
R" is H or $CH_3$, and
the subscript m and n each independently have a value from 1 to 10, and
b) a second polyorganosiloxane having an average, per molecule, of at least 2 aliphatically unsaturated organic groups,
in the presence of c) a second hydrosilylation catalyst and d) an inhibitor for the second hydrosilylation catalyst.

5. The method according to claim 1 further comprising:
(i) mixing a silicone reactive diluent with the thermally conductive clustered functional polymer after step (h) and prior to step (b)
(j) cooling the second mixture to below 50° C.;
(k) mixing an additional amount of the thermally conductive filler and an additional amount of filler treating agent with the thermally conductive clustered functional polymer after step (j) and prior to step (b) to form a third mixture;
(l) heating the third mixture to a temperature from 50° C. to 110° C. to in situ treat the additional amount of thermally conductive filler with the additional amount of filler treating agent in the presence of the silicone reactive diluent.

6. The method according to claim 5, wherein the silicone reactive diluent comprises the reaction product of a reaction of:
a) a polyorganohydrogensiloxane having an average of 10 to 200 silicon atoms per molecule, and
b) a second reactive species having, per molecule, at least 1 aliphatically unsaturated organic group and 1 or more curable groups,
in the presence of c) a second isomer reducing agent and d) a second hydrosilylation catalyst and e) inhibitor for the second hydrosilylation catalyst.

7. The method according to claim 5, wherein the silicone reactive diluent comprising the reaction product of a reaction of:
a) a siloxane compound according to the formula:

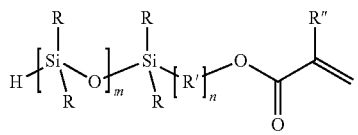

wherein:
R is a monovalent hydrocarbon having 1 to 6 carbon atoms,
R' is a monovalent hydrocarbon having 3 to 12 carbon atoms,
R" is H or $CH_3$, and
the subscript m and n each independently have a value from 1 to 10, and
b) a second polyorganosiloxane having an average, per molecule, of at least 2 aliphatically unsaturated organic groups,
in the presence of c) a second hydrosilylation catalyst and d) an inhibitor for the second hydrosilylation catalyst.

8. The method according to claim 1 further comprising
(m) blending at least one additional component with the thermally conductive clustered functional polymer prior to step (b), the at least one component selected from the group consisting of (V) a moisture cure initiator, (VI) a crosslinker, (VII) a moisture cure polymer, (VIII) a solvent, (IX) an adhesion promoter, (X) a colorant, (XI) a reactive diluent, (XII) a corrosion inhibitor, (XIII) a polymerization inhibitor, (XIV) an acid acceptor, and any combination thereof.

9. The method as set forth in claim 8, wherein the (VI) crosslinker and the moisture cure polymer (VII) are both present in thermally conductive thermal radical cure silicone composition and wherein the amount of the crosslinker (VI) comprises from 0.001 to 50 weight percent of the total weight of moisture cure polymer (VII) and wherein the amount of the moisture cure polymer (VII) comprises from 0.1 to 5 weight percent of the total weight of thermally conductive thermal radical cure silicone composition.

10. The method according to claim 1, wherein the thermally conductive filler comprises from 30 to 80 volume percent of the total volume of the thermally conductive thermal radical cure silicone composition.

11. The method as set forth in claim 10, wherein the (VI) crosslinker and the moisture cure polymer (VII) are both present in thermally conductive thermal radical cure silicone composition and wherein the amount of the crosslinker (VI) comprises from 0.001 to 50 weight percent of the total weight of moisture cure polymer (VII) and wherein the amount of the moisture cure polymer (VII) comprises from 0.1 to 5 weight percent of the total weight of thermally conductive thermal radical cure silicone composition.

12. The method as set forth in claim 1, wherein the thermally conductive thermal radical cure silicone composition has a thermal conductivity greater than 0.5 watts per meter kelvin.

13. A method for forming a conductive cured substrate comprising:
(a) forming a thermally conductive thermal radical cure silicone composition in accordance with the method of claim 1;
(b) applying the thermally conductive thermal radical cure silicone composition to a substrate; and
(c) curing the thermally conductive thermal radical cure silicone composition on the substrate to form the conductive cured substrate.

14. A method for forming a cured thermally conductive thermal radical cure silicone composition comprising:
(a) forming a thermally conductive thermal radical cure silicone composition in accordance with the method of claim 1; and
(b) curing the thermally conductive thermal radical cure silicone composition.

* * * * *